US012397183B1

(12) United States Patent
Rawat et al.

(10) Patent No.: US 12,397,183 B1
(45) Date of Patent: Aug. 26, 2025

(54) AUTONOMOUS FOREST FIRE DETECTION, ALERTING AND MITIGATION FOR COMMUNITIES

(71) Applicants: Rhea Rawat, Edison, NJ (US); Ritika Rawat, Edison, NJ (US)

(72) Inventors: Rhea Rawat, Edison, NJ (US); Ritika Rawat, Edison, NJ (US)

( * ) Notice: Subject to any disclaimer, the term of this patent is extended or adjusted under 35 U.S.C. 154(b) by 0 days.

(21) Appl. No.: 19/079,613

(22) Filed: Mar. 14, 2025

(51) Int. Cl.
*A62C 3/02* (2006.01)

(52) U.S. Cl.
CPC .................................. *A62C 3/0271* (2013.01)

(58) Field of Classification Search
None
See application file for complete search history.

(56) References Cited

U.S. PATENT DOCUMENTS

| | | | | |
|---|---|---|---|---|
| 8,291,990 | B1 * | 10/2012 | Mohr | A62C 3/02 169/70 |
| 10,045,187 | B1 * | 8/2018 | Soleimani | H04W 4/90 |
| 11,295,131 | B1 * | 4/2022 | Dhawan | G08G 5/80 |
| 11,308,595 | B1 * | 4/2022 | Wheeler | G06T 5/50 |
| 12,208,295 | B1 | 1/2025 | Lee et al. | |
| 2012/0261144 | A1 * | 10/2012 | Vian | G08B 17/125 169/43 |
| 2019/0169837 | A1 * | 6/2019 | Conboy | A62C 3/0214 |
| 2019/0169841 | A1 * | 6/2019 | Conboy | E04B 1/944 |
| 2020/0242916 | A1 | 7/2020 | Krstanovic et al. | |
| 2023/0256275 | A1 | 8/2023 | Velasquezfernandez | |
| 2024/0296726 | A1 * | 9/2024 | Ye | H04N 7/181 |
| 2024/0321074 | A1 * | 9/2024 | Brinkschulte | G08B 17/005 |
| 2025/0082972 | A1 * | 3/2025 | Brinkschulte | G08B 29/186 |

FOREIGN PATENT DOCUMENTS

| | | | |
|---|---|---|---|
| CN | 209591026 U | * | 11/2019 |

* cited by examiner

*Primary Examiner* — Muhammad Adnan

(57) ABSTRACT

Various embodiments for an autonomous forest fire detection, alerting and mitigation device includes a subterranean data gatherer having a plurality of soil temperature and soil moisture sensors installed at a plurality of different depths in a soil. A data assimilator that has a configured threshold change depending on the plurality of different depths in the soil of the plurality of soil temperature and soil moisture sensors, the soil properties, the duration of the fire, and a time delay duration. The data assimilator receives a data transmission packet from the subterranean data gatherer and detects a fire and generates a fire alert when the plurality of soil temperature and soil moisture sensors all breach the configured threshold change. A smart water pump is also started to slow the fire or completely stop it. The subterranean data gatherer is installed at the plurality of different depths in the soil.

7 Claims, 16 Drawing Sheets

AUTONOMOUS FOREST FIRE DETECTION, ALERTING AND MITIGATION FOR COMMUNITIES

BACKGROUND OF THE INVENTION

Forest fires contribute to 20% of carbon dioxide ($CO_2$) in the atmosphere and cause irreparable ecological damage. Due to increased urbanization of the once-forested regions, more homes are at risk of wildfire damage. The fires are either detected very late and have grown significantly, or there is a lack of water and availability of firefighters for adequate response. As multiple fires start in an area, the fire response systems struggle due to the lack of resources. Existing fire detection methods for example human-based observation, satellite detection, optical cameras, and Wireless Sensor Networks (WSN) have low to medium reliability. Human-based observation methods have detection delays. Satellite detection is costly and detects fires once they become large and is impacted by clouds. Clouds and other environmental conditions impact optical camera-based solutions. WSN is plagued by false alarm repetitions. The issues with WSN-based solutions are either due to the type of sensors used or the technology used for data or image capture. Ambient sensors for example smoke, gas, thermal, and flame detectors raise false alarms due to fog, clouds, sunlight, and non-smoke objects. Solutions based on ambient surroundings monitoring have to deal with air pollution issues and other environmental conditions and are highly unreliable. These remotely installed systems also get destroyed or damaged in forest fires.

SUMMARY OF THE INVENTION

Various embodiments provide a method and apparatus for an autonomous forest fire detection, alerting and mitigation for communities. Various aspects include installing a plurality of a subterranean data gatherer around a community. The subterranean data gatherer utilizes a plurality of soil temperature and soil moisture sensors installed at a plurality of different depths in a soil. The subterranean data gatherer transmits data using a data transmission packet to a data assimilator. The community is surrounded by underground installation of a series of interconnected rainwater harvesting tanks that are connected to a plurality of a smart water pump. When a fire starts, the data assimilator detects fire and generates a fire alert using the data transmission packet sent by the subterranean data gatherer generates a fire alert and sends the data transmission packet to the smart water pump that is closest to the location of the fire to start a sprinkler. The sprinkler uses the series of interconnected rainwater harvesting tanks to mitigate the fire and to either slow the fire down or completely put the fire out. The data assimilator communicates with a data processing device to provide a real time alerts and data to a community members over a mobile app and desktop.

In some aspects, the plurality of different depths in the soil of the plurality of soil temperature and soil moisture sensors is decided by the soil properties including thermal conductivity, thermal diffusivity, volumetric heat capacity, the soil type, the soil density and the soil porosity.

In some aspects, the data assimilator has a configured threshold change for the plurality of soil temperature and soil moisture sensors. The configured threshold change is defined based on the plurality of different depths in the soil of the plurality of soil temperature and soil moisture sensors, a duration of time since a start of the fire, and a time delay duration. The data assimilator generates the fire alert when the plurality of soil temperature and soil moisture sensors have all individually breached the configured threshold change.

In some aspects, the subterranean data gatherer is placed inside a subterranean data gatherer housing and the subterranean data gatherer housing is installed at the plurality of different depths in the soil. The subterranean data gatherer housing is made of fire-resistant materials and is waterproof. In some aspects the subterranean data gatherer housing is installed on top of a trolley platform installed at the plurality of different depths in the soil such that a handle of the trolley platform is above the surface of the soil to easily locate the subterranean data gatherer for any maintenance.

The features and functions can be achieved independently in various embodiments of the present disclosure or may be combined in yet other embodiments in which further details can be seen with reference to the following description and drawings.

BRIEF DESCRIPTION OF DRAWINGS

The novel features believed characteristics of the illustrative embodiments are set forth in the appended claims. The illustrative embodiments, further objectives and features thereof, will best be understood by reference to the following detailed description of an illustrative embodiment of the present disclosure when read in conjunction with the accompanying drawings wherein:

DETAILED DESCRIPTION OF THE INVENTION

Various embodiments will be described in detail with reference to the accompanying drawings. Wherever possible, the same reference numbers will be used throughout the drawings to refer to the same parts. References made to particular examples and implementation are for illustrative purposes, and are not intended to limit the scope of the claims.

The various illustrative embodiments provide a method and apparatus for the autonomous forest fire detection, alerting and mitigation for communities.

Figure 1:
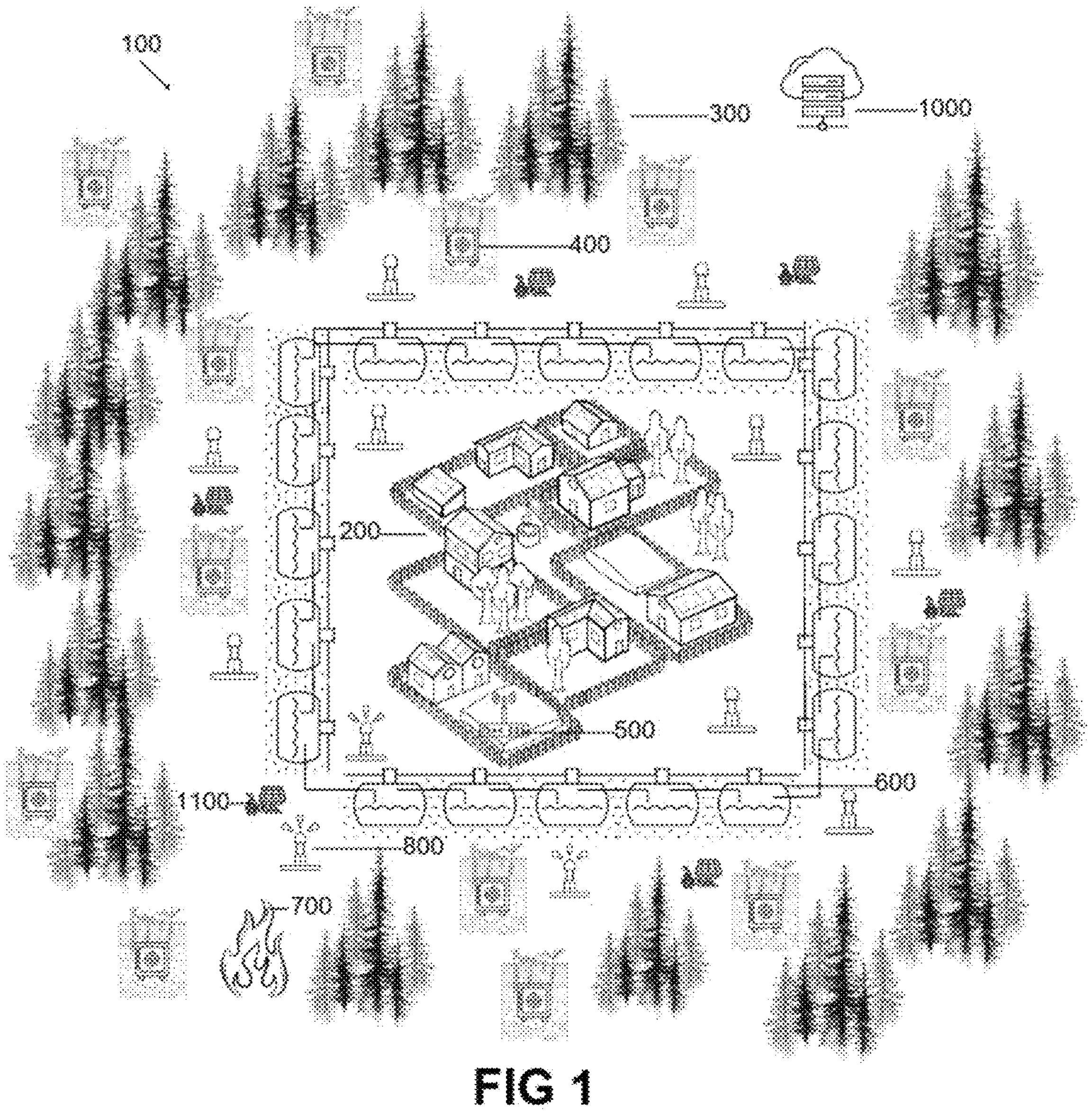
FIG. 1 is an illustration of components of the autonomous forest fire detection, alerting and mitigation for communities in accordance with an illustrative embodiment.

With reference now to the figures and, in particular, with reference to FIG. 1, an illustration of components of the autonomous forest fire detection, alerting and mitigation for communities is depicted in accordance with an illustrative embodiment. As depicted, the autonomous forest fire detection, alerting and mitigation for communities 100 includes the community 200. The community 200 is surrounded by a forest 300. In order to detect fire, the plurality of the subterranean data gatherer 400 are installed around the community 200. The subterranean data gatherer 400 utilize the plurality of soil temperature and soil moisture sensors. The subterranean data gatherer 400 transmits data using the data transmission packet 470 (FIG. 12) with a message identifier to the data assimilator 500. The community 200 is surrounded by underground installation of the series of interconnected rainwater harvesting tanks 600 that are connected to the plurality of the smart water pump 1100. When the fire 700 starts, the data assimilator 500 on detection of the fire 700 using the data transmission packet 470 (FIG. 12) sent by the subterranean data gatherer 400 generates the fire alert 514 (FIG. 7) and sends the data transmission packet 470 (FIG. 12) to the smart water pump 1100 that is closest to the location of the fire 700 to start the sprinkler 800 which uses the series of interconnected rainwater harvesting tanks 600 to mitigate the fire 700 and to either slow the fire 700 down or completely put the fire 700 out. The data assimilator 500 communicates with the data processing device 1000 to provide the real time alerts and data to the community members over the mobile app and desktop.

Figure 2:
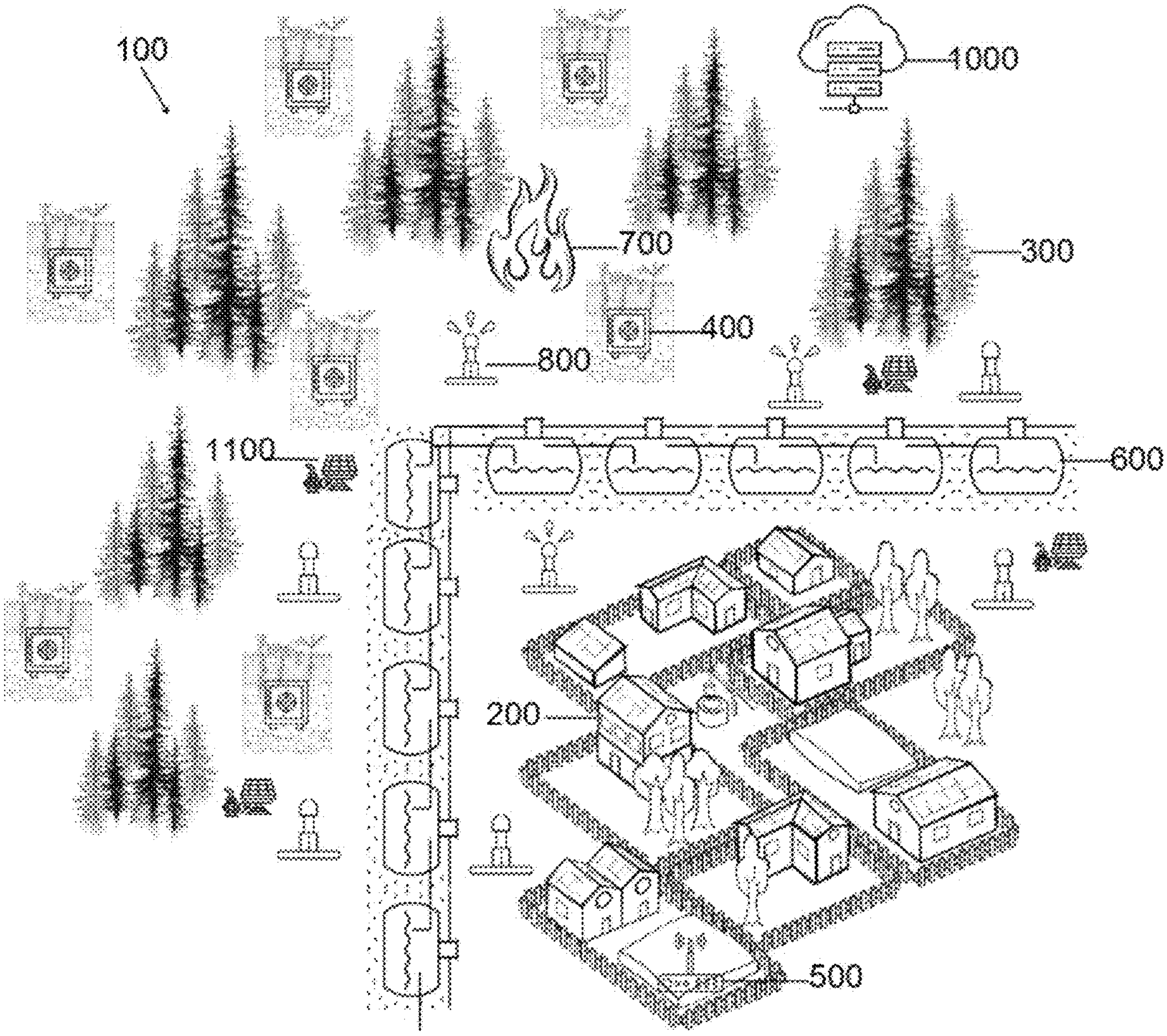
FIG. 2 is an illustration of components of the autonomous forest fire detection, alerting and mitigation for communities in accordance with an illustrative embodiment.

With reference to FIG. 2, an illustration of components of the autonomous forest fire detection, alerting and mitigation for communities 100 is depicted in accordance with an illustrative embodiment when in this particular example, the community 200 is surrounded by the forest 300 partially on one side. As depicted, the plurality of the subterranean data gatherer 400 are installed around the community 200 covering the area that is at risk of the fire 700. The subterranean data gatherer 400 transmits data using the data transmission packet 470 (FIG. 12) to the data assimilator 500. The community 200 is surrounded by underground installation of the series of interconnected rainwater harvesting tanks 600 that are connected to the plurality of the smart water pump 1100 covering the area that is at risk of fire 700. When the fire 700 starts, the data assimilator 500 on detection of the fire 700 using the data transmission packet 470 (FIG. 12) sent by the subterranean data gatherer 400 generates the fire alert 514 (FIG. 7) and sends the data transmission packet 470 (FIG. 12) to the smart water pump 1100 that is closest to the location of the fire 700 to start the sprinkler 800 which uses the series of interconnected rainwater harvesting tanks 600 to mitigate the fire 700 and to either slow the fire 700 down or completely put the fire 700 out. The data assimilator 500 communicates with the data processing device 1000 to provide the real time alerts and data to the community members over the mobile app and desktop.

FIG. 1 and FIG. 2 are presented as example configurations of components of the autonomous forest fire detection, alerting and mitigation for communities and are not meant to imply limitations to other configurations. One or more aspects of the embodiments represent a fully autonomous forest fire detection, alerting and mitigation for communities that is not reliant on any firefighting resources and can slow the fire providing valuable time for evacuations. The presence of autonomous forest fire detection, alerting and mitigation for communities across multiple communities allows for autonomous management of fires within communities allowing for evacuation and saving valuable property. One or more aspects of the embodiments represent the additional advantage of firefighting resources of the city not being overstretched as multiple fires start in a jurisdiction as well as solution for lack of water in these cases.

Figure 3:
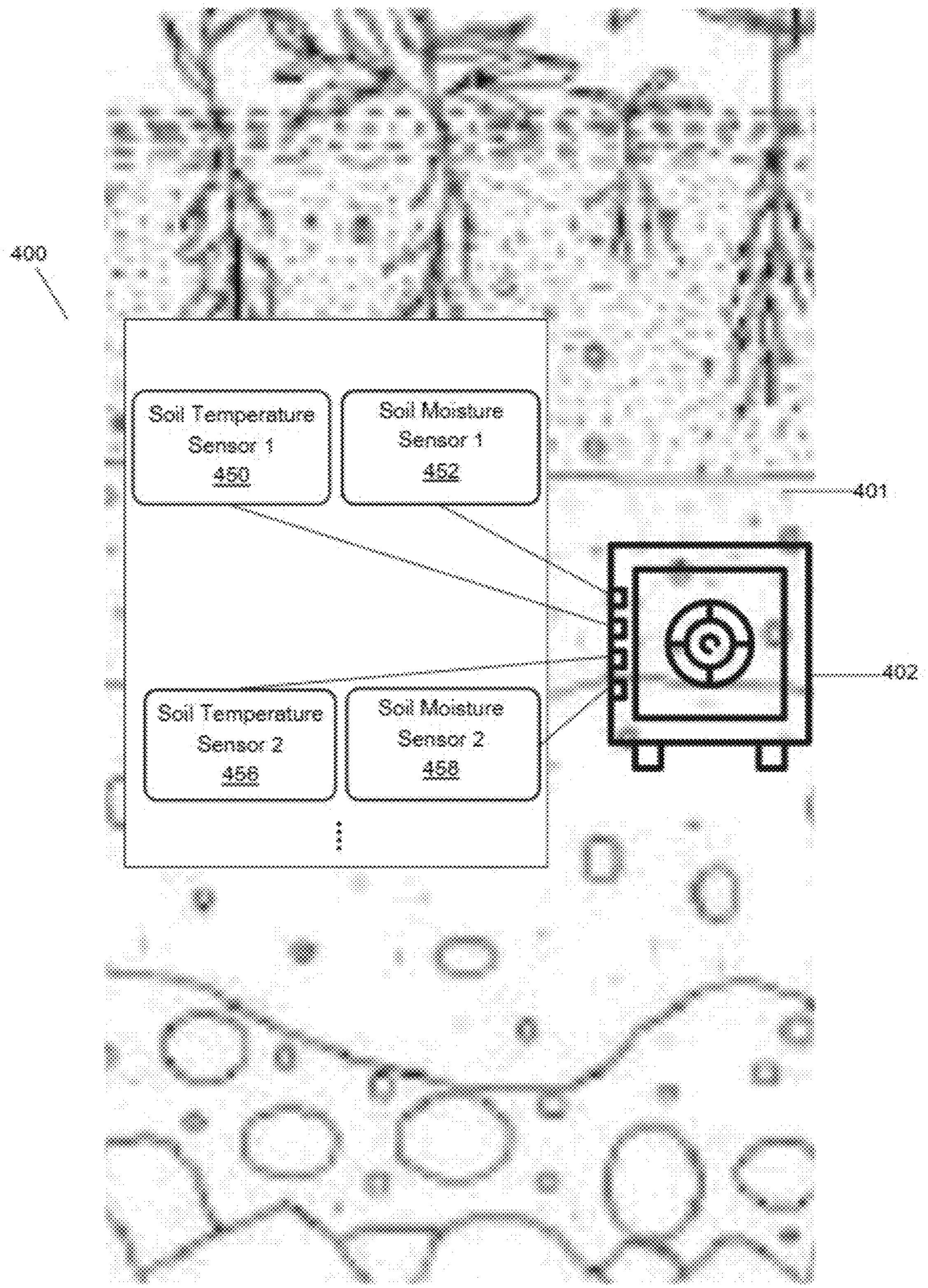
FIG. 3 is an illustration of the subterranean data gatherer deployment in the soil in accordance with an illustrative embodiment.

FIG. 3 is an illustration of the subterranean data gatherer 400 deployment in the soil 401 in accordance with an illustrative embodiment. The subterranean data gatherer 400 consists of the subterranean data gatherer housing 402. The subterranean data gatherer 400 comprises of the plurality of soil temperature and soil moisture sensors installed at the plurality of different depths in the soil 401. The plurality of soil temperature and soil moisture sensors are the parts of the subterranean data gatherer 400 that are exposed outside the subterranean data gatherer housing 402 and are in direct contact with the soil 401.

In some embodiments the subterranean data gatherer 400 has two sensors a soil temperature sensor 1 450 and a soil moisture sensor 1 452 installed at a 1-inch depth in the soil 401. In some embodiments the subterranean data gatherer 400 has four sensors the soil temperature sensor 1 450 and the soil moisture sensor 1 452 installed at the 1-inch depth in the soil 401 and a soil temperature sensor 2 456 and a soil moisture sensor 2 458 installed at a 3-inch depth in the soil 401. In some embodiments the subterranean data gatherer 400 has the plurality of soil temperature and soil moisture sensors installed at the plurality of different depths for example 1-inch, 3-inch and 5-inch in the soil 401 respectively. These embodiments and the number of soil sensors and the type of soil sensors used and their installation depths are presented as example configurations and is not intended to be exhaustive or limited to the embodiments in the form disclosed.

In contrast with ambient environment conditions, the below ground soil temperature and soil moisture change gradually during the course of the day. During precipitation, the soil moisture will increase but the soil temperature will not rise rapidly. The condition under which both the soil temperature and soil moisture rise rapidly is during a surface fire. Hence one or more aspects of the present embodiment that utilizes subterranean soil-based sensors for detecting fire removes the issue of false alarm repetitions that plague ambient sensor-based solutions and solutions that combine ambient sensors and soil-based sensors.

In some embodiments the subterranean data gatherer 400 utilizes contact-based sensors that come in direct contact with the soil 401 providing accurate measurements. Common examples include thermocouples, resistance temperature detectors (RTDs) and thermistors. These sensors are inserted into the soil 401 to measure temperature at different depths. In some embodiments the subterranean data gatherer 400 utilizes capacitive soil moisture sensor. In some embodiments the subterranean data gatherer 400 utilizes TDR (Time Domain Reflectometry) or FDR (Frequency Domain Reflectometry) for soil moisture sensor. The type of sensors used will drive the cost of the subterranean data gatherer 400.

The subterranean data gatherer 400 are installed in immediate vicinity of the community 200 and also cover a certain area of the forest 300. In some embodiments the subterranean data gatherer 400 can be deployed 5 miles into the forest 300. In some embodiments the subterranean data gatherer 400 can be deployed 10 miles into the forest 300. The area being covered should be considered when considering the type of sensors to be used. In some embodiments the subterranean data gatherer 400 can be made with different types of sensors depending on the upfront cost, longevity and maintenance of the plurality of soil temperature and soil moisture sensors.

The subterranean data gatherer housing 402 itself is installed at the plurality of different depths in the soil 401. In some embodiments a 1-foot pit is dug in the soil 401. The subterranean data gatherer housing 402 is installed at the bottom of the 1-foot pit. In some embodiments the subterranean data gatherer housing 402 is installed further deep in the soil 401 for example at 2 feet or 3 feet depth.

The depth at which the plurality of soil temperature and soil moisture sensors of the subterranean data gatherer 400 should be deployed is decided by the soil 401 properties including a thermal conductivity, a thermal diffusivity, a volumetric heat capacity, a type, a density and a porosity. High soil density means high thermal conductivity, so densely packed soil heats and cools faster than loosely packed soil. Soil water content or the fraction of pores filled with water is a major factor in heat conductivity. Thermal conductivity decreases when the fraction of soil pores filled with air increases, in medium-textured soils this relation is linear. Soil thermal conductivity means how fast heat moves through the soil, but it also changes as a consequence of heating. Thermal conductivity increases 3 to 5 times when soil is heated up to 90° C. Therefore, the subterranean data gatherer should be installed deeper for a sandy loam soil location as compared to a silty clay soil location. Also, if a location has more densely packed soil, then the subterranean data gatherer should be installed deeper. Hence the depth at which the plurality of soil temperature and soil moisture sensors are installed should be site-specific. The reason to install at a depth based on soil 401 is for the plurality of soil temperature and soil moisture sensors to survive the fire 700.

In some embodiments the subterranean data gatherer housing 402 is made out of fire-resistant materials for example cement, steel, gypsum, cast iron, stone, brick and mortar. In some embodiments the subterranean data gatherer housing 402 may also have fire-resistant insulation for example ceramic fiber insulation. In some embodiments the subterranean data gatherer housing 402 may incorporate additional elements such as vermiculite, perlite and fire-retardant sealants to enhance their protective capabilities. In some embodiments the subterranean data gatherer housing 402 may incorporate advanced composite materials that combine the strength of steel with the heat resistance of specialized polymers and ceramics.

In some embodiments the subterranean data gatherer housing 402 is made waterproof by using a closed-cell foam gasket. When the subterranean data gatherer housing 402 is closed, pressure forms a durable barrier between the water outside and the interior of the subterranean data gatherer housing 402. In some embodiments the subterranean data gatherer housing 402 is made waterproof by applying a covering of polyutherane. In some embodiments the subterranean data gatherer housing 402 is made waterproof by applying a cementitious coating of sand, organic and inorganic substances with silica-based materials. In some embodiments the subterranean data gatherer housing 402 is made waterproof by using either EPDM rubber, rubberized asphalt, thermoplastic or bituminous membrane. Off course, a combination of these different types of fire resistant and water proofing materials can be used.

Since the subterranean data gatherer housing 402 is placed in the soil 401, the subterranean data gatherer housing 402 is designed to survive the fire 700. The fire surviving capability comes from the depth of the installation of the subterranean data gatherer housing 402, the fire proofing material being used for the subterranean data gatherer housing 402 and due to the thermal conductivity of the soil 401 being low. Due the thermal conductivity of the soil 401 being low and the volumetric heat capacity of the soil 401 being high, the plurality of soil temperature and soil moisture sensors are also likely to survive the fire. Hence one or more aspects of the present disclosure is in contrast with existing solutions where most components are destroyed in the fire and hence do not function at the time of the fire.

In some embodiments during the installation of the subterranean data gatherer 400 a service laptop can be used to set a sender ID of the subterranean data gatherer 400, a destination ID of the data assimilator 500 and a geolocation of the subterranean data gatherer 400. The sender ID of the subterranean data gatherer 400, the destination ID of the data assimilator 500 and the geolocation of the subterranean data gatherer 400 data is then sent in the data transmission packet 470 (FIG. 12) by the subterranean data gatherer 400 to the data assimilator 500 along with a temperature and moisture sensor data for the plurality of soil temperature and soil moisture sensors. The sender ID and the geolocation would be unique for individual subterranean data gatherer 400.

These embodiments are presented as example configurations and are not intended to be exhaustive or limited to the embodiments in the form disclosed.

Figure 4:
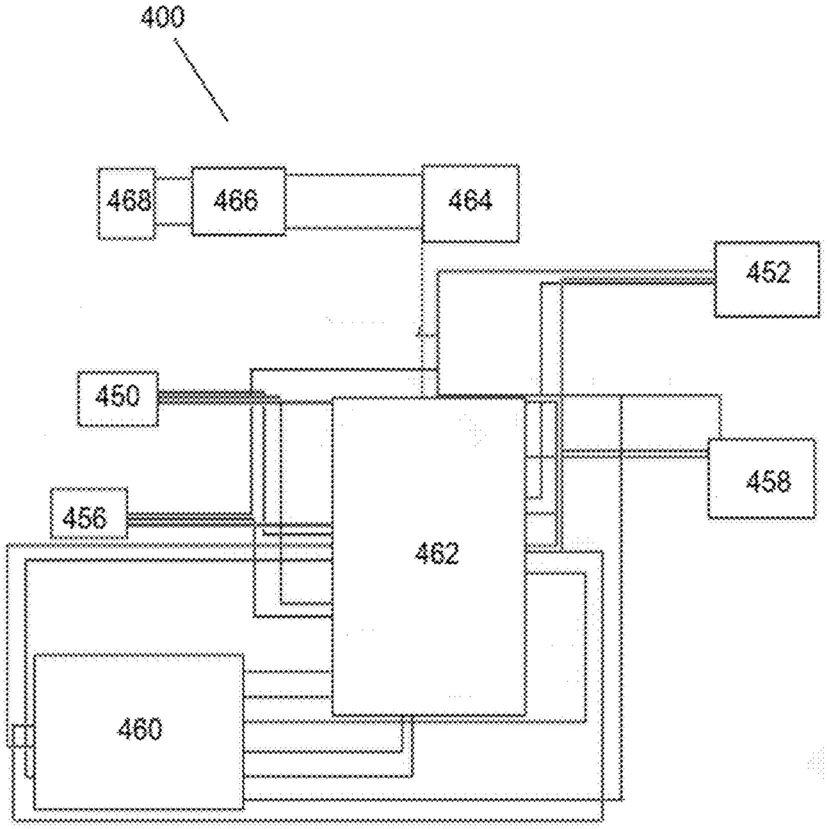
FIG. 4 is an illustration of the subterranean data gatherer in accordance with an illustrative embodiment.

FIG. 4 is an illustration of the subterranean data gatherer 400 in accordance with an illustrative embodiment. In this depicted example the subterranean data gatherer 400 is an example of one low-cost implementation for the subterranean data gatherer 400. The subterranean data gatherer 400 in this example embodiment comprises of four sensors, the soil temperature sensor1 450 and the soil temperature sensor 2 456 with adapter modules for Arduino (DS18B20), capacitive soil moisture sensors the soil moisture sensor 1 452 and the soil moisture sensor 2 458 for Arduino, a microprocessor 462 (ATmega328P/CH340, Arduino nano board), a radio module 460 (RFM95 W 915 Mhz LoRa wireless receiver transmitter), a rechargeable battery 464, a charging board 466, and a solar panel 468.

In some embodiments the soil temperature sensor1 450, the soil temperature sensor 2 456, the soil moisture sensor 1 452 and the soil moisture sensor 2 458 on one end are attached to the microprocessor and the other end extends out of the subterranean data gatherer housing 402 (FIG. 3) and is installed at the plurality of different depths in the soil 401 (FIG. 3). In some embodiments the microprocessor 462, the radio module 460, the rechargeable battery 464, the charging board 466 are secured inside the subterranean data gatherer housing 402 (FIG. 3) while the solar panel 468 is installed above ground.

Figure 12:
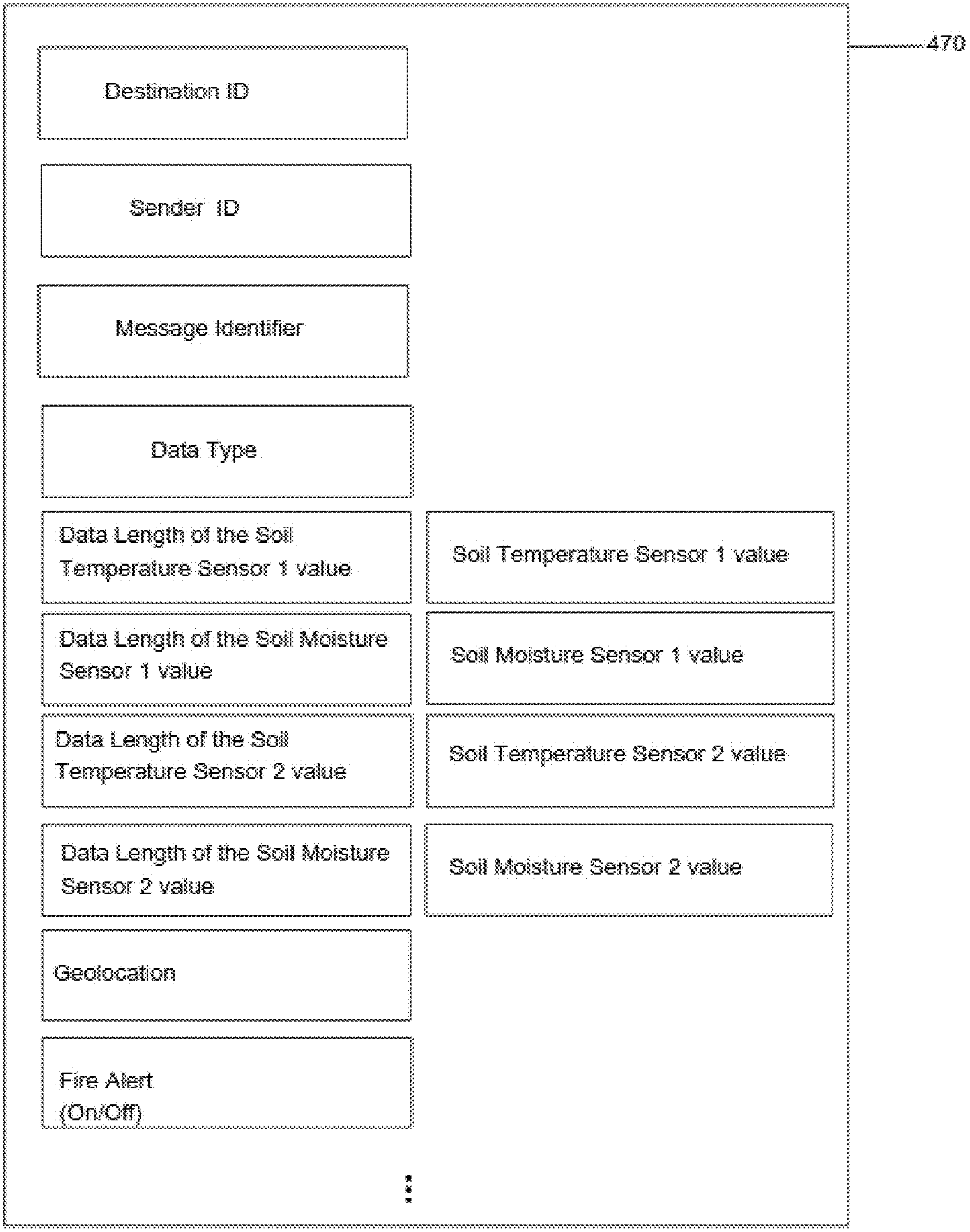
FIG. 12 is an illustration of a block diagram illustrating architecture of the data transmission packet suitable for use with various embodiments.

In some embodiments the soil temperature sensor1 450 and the soil temperature sensor 2 456 capture a soil temperature at the plurality of different depths in the soil 401. The soil moisture sensor 1 452 and the soil moisture sensor 2 458 capture a soil moisture at the plurality of different depths in the soil 401. In some embodiments the microprocessor 462 uses standard arduino libraries to process the data of the plurality of soil temperature and soil moisture sensors and create the data transmission packet 470 (FIG. 12). The data transmission packet 470 (FIG. 12) is then sent to the data assimilator 500 using the radio module 460. The microprocessor 462 is powered by the rechargeable battery 464.

In some low-cost embodiments Raspberry Pi, NodeMCU, MSP430 Launch Pad, STM32 microprocessors or any other commercially available microprocessor can be used. In other embodiments different types of microprocessors for example application specific integrated circuit processors, reduced instruction set microprocessors, digital signal processors or any other commercially available microprocessor can be used. In some embodiments LTE-M and Narrowband-IoT (NB-IoT). Sigfox, Weightless SIG can be used instead of LoRa. The rechargeable battery 464 is known to last for 10 years or more and adding the solar panel 468 ensures the rechargeable battery 464 remains charged. In some embodiments other renewable methods to charge the rechargeable battery 464 can be used including wind power, hydroelectric power and geothermal energy. Of course, in some embodiments a combination of renewable energy sources can be used.

Figure 5:
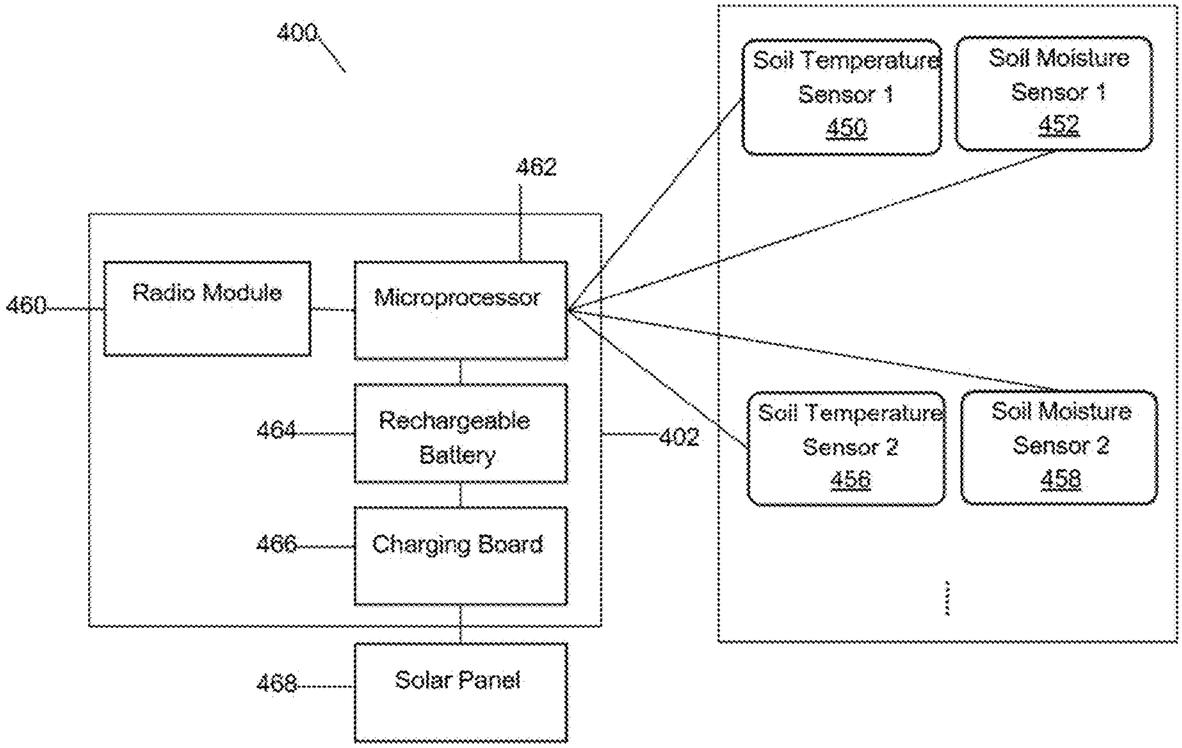
FIG. 5 is an illustration of a block diagram of the subterranean data gatherer in accordance with an illustrative embodiment.

FIG. 5 is an illustration of a block diagram of the subterranean data gatherer 400 in accordance with an illustrative embodiment. In some embodiments the plurality of soil temperature and soil moisture sensors are attached to the microprocessor 462. In some embodiments the wires connecting the microprocessor 462 and the plurality of soil temperature and soil moisture sensors are made waterproof by applying a covering of polyutherane. In some embodiments the wires are made waterproof by applying a cementitious coating of sand, organic and inorganic substances with silica-based materials. In some embodiments the wires are made waterproof by using either EPDM rubber, rubberized asphalt, thermoplastic or bituminous membrane. In some embodiments the wires are covered in fire-retardant sealants or fire-resistant insulation. Of course, a combination of these different types of fire resistant and water proofing materials can be used. The radio module 460 is attached to the microprocessor 462 and is used to send the data transmission packet 470 (FIG. 12) to the data assimilator 500. The rechargeable battery 464 is attached to the microprocessor 462 and the rechargeable battery 464 is charged using the solar panel 468 through the charging board 466. In some embodiments the subterranean data gatherer housing 402 consists of the radio module 460, the microprocessor 462, the rechargeable battery 464, and the charging board 466. The solar panel 468 which is exposed above the soil 401 is the single sacrificial component of the subterranean data gatherer 400 in the event of a fire.

The subterranean data gatherer 400 can be configured to send the data transmission packet 470 (FIG. 12) to the data assimilator 500 at a time interval that can be configured. In some embodiments the data transmission packet 470 (FIG. 12) can be sent at the time interval of 5 seconds. In other embodiments the data transmission packet 470 (FIG. 12) can be sent at the time interval of 10 seconds, or 15 seconds, or 20 seconds etc.

These embodiments are presented as example configurations and are not intended to be exhaustive or limited to the embodiments in the form disclosed.

Figure 6:
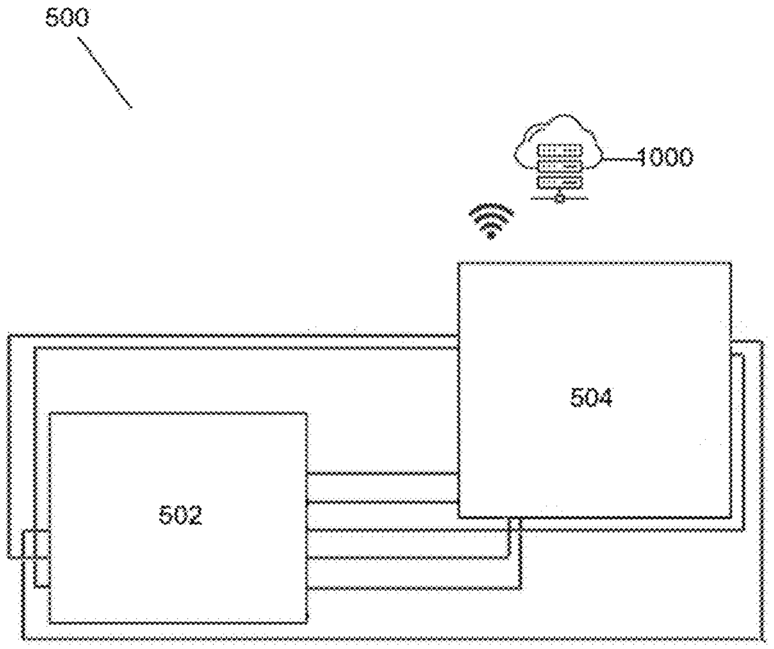
FIG. 6 is an illustration of the data assimilator in accordance with an illustrative embodiment.

FIG. 6 is an illustration of the data assimilator 500 in accordance with an illustrative embodiment. In this depicted example embodiment, the data assimilator 500 is an example of one low-cost implementation for the data assimilator 500. The data assimilator 500 comprises of a microprocessor 504 (Arduino Nano ESP32 IoT) and a radio module 502 (RFM95 W 915 Mhz LoRa wireless receiver transmitter). In some embodiments the data assimilator 500 is placed in a central location with access to a WIFI and a dedicated power source. The data assimilator 500 receives the data transmission packet 470 (FIG. 12) from the subterranean data gatherer 400 over radio frequency using the radio module 502. In some embodiments uninterruptable power supply UPS can be used to supply power to the data assimilator 500 so even if power is out the data assimilator 500 can function.

In some low-cost embodiments Raspberry Pi, NodeMCU, MSP430 Launch Pad, STM32 microprocessors or any other commercially available microprocessor can be used for microprocessor 504. In other embodiments different types of microprocessors for example application specific integrated circuit processors, reduced instruction set microprocessors, digital signal processors or any other commercially available microprocessor can be used. The data assimilator 500 communicates with the data processing device 1000 to provide the real time alerts and data to the community members over the mobile app and desktop.

In some embodiments LTE-M and Narrowband-IoT (NB-IoT). Sigfox, Weightless SIG can be used instead of LoRa. In some embodiments the data assimilator 500 uses 5G cellular network, Zigbee, LoRaWAN, Light Fidelity to send data to the data processing device 1000. In some embodiments the data processing device 1000 can be a server in a physical data center or an IoT cloud-based solution.

Figure 7:
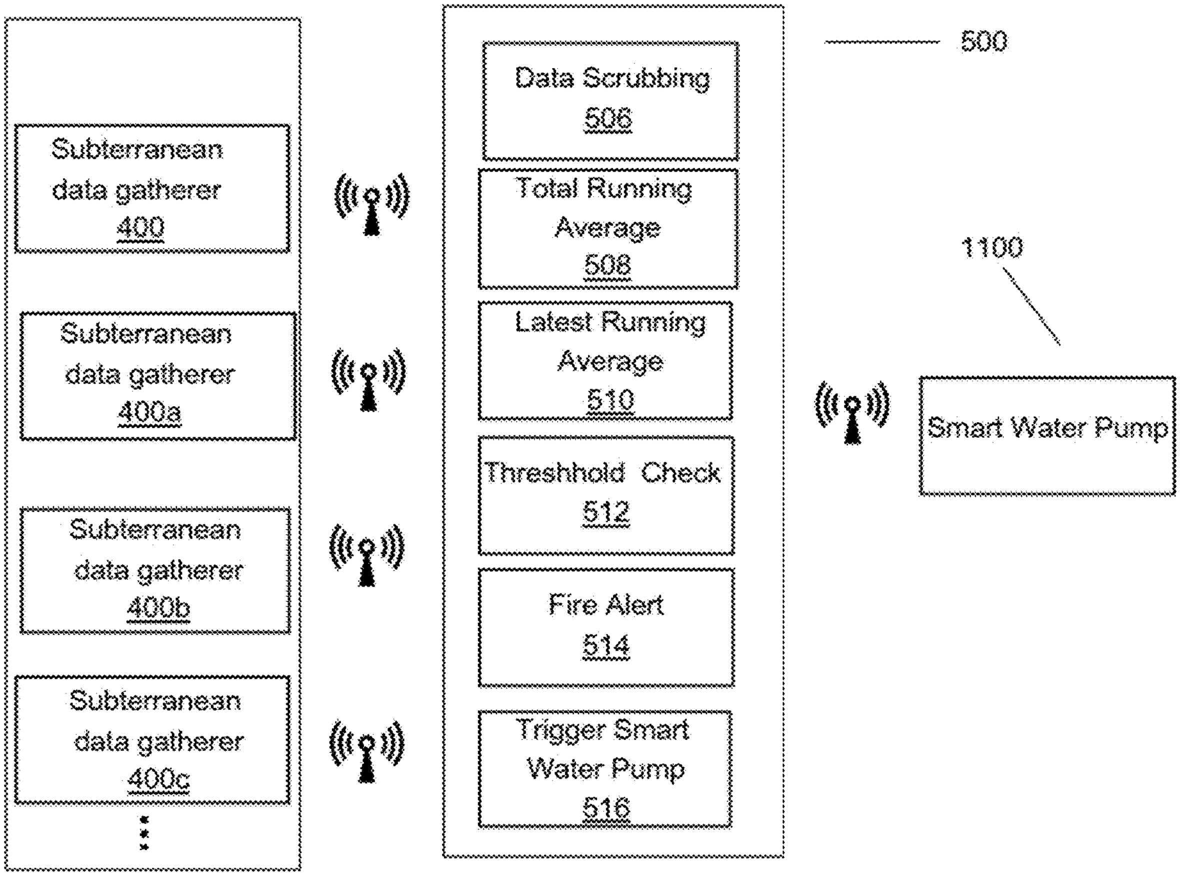
FIG. 7 is an illustration of a block diagram of the subterranean data gatherer, the data assimilator and the smart water pump in accordance with an illustrative embodiment.

The data processing device 1000 provides the real time alerts and data to the community members over the mobile app and desktop. In some embodiments this can include real time data from the plurality of soil temperature and soil moisture sensors from the subterranean data gatherer 400. In some embodiments this can include a threshold check 512 (FIG. 7), the fire alert 514 (FIG. 7) and the status of the smart water pump 1100 (FIG. 7). In some embodiment this can include data collected over time. In some embodiments when the fire 700 starts, the data assimilator 500 on detection of the fire 700 using the data transmission packet 470 (FIG. 12) sent by the subterranean data gatherer 400 generates the fire alert 514 (FIG. 7) and sends the data transmission packet 470 (FIG. 12) to the smart water pump 1100 that is closest to the location of the fire 700 to start the sprinkler 800 which uses the series of interconnected rainwater harvesting tanks 600 to mitigate the fire 700 and to either slow the fire 700 down or completely put the fire 700 out. The data assimilator 500 in parallel also sends the data to the data processing device 1000 to provide the real time alerts to the community members over the mobile app and desktop so the community members can evacuate if required.

In some embodiments during the installation of the data assimilator 500 the service laptop is used to set the sender ID and the geolocation of the data assimilator 500. The Sender ID and the geolocation would be unique for the data assimilator 500.

These embodiments are presented as example configurations and are not intended to be exhaustive or limited to the embodiments in the form disclosed.

FIG. 7 is an illustration of a block diagram of the subterranean data gatherer 400, the data assimilator 500 and the smart water pump 1100 in accordance with an illustrative embodiment. The individual subterranean data gatherer 400, 400*a*,400*b*,400*c* send the data transmission packet 470 (FIG. 12) to the data assimilator 500. In some embodiments the subterranean data gatherer 400 sends the data transmission packet 470 (FIG. 12) for the soil temperature sensor 450 and 456 and the soil moisture sensor 452 and 458 at the time interval that is configured.

The data assimilator 500 on receiving the data transmission packet 470 (FIG. 12) applies a data scrubbing 506. The data assimilator 500 on receiving the data transmission packet 470 (FIG. 12) checks the destination ID on the data transmission packet 470 (FIG. 12) and consumes the data transmission packet 470 (FIG. 12) if the destination ID matches the data assimilator 500 sender ID. The data assimilator 500 would also ensure that it does not consume the data transmission packet 470 (FIG. 12) with the message identifier that it has already processed earlier. In some embodiments the data assimilator 500 filters out the temperature and moisture sensor data that are significant outliers. In some embodiments machine learning techniques can be used to identify and remove the temperature and moisture sensor data that is outlier. The data scrubbing 506 is applied to the data transmission packets 470 (FIG. 12) individually to the soil temperature sensor 450 and 456 sensor data and individually to the soil moisture sensor 452 and 458 sensor data.

In some embodiments the data assimilator 500 on receiving the data transmission packet 470 (FIG. 12) calculates a total running average 508. In some embodiments the total running average 508 is calculated based on using a configurable period of time. In some embodiments the configurable period of time may be 4 hours. In some embodiments the configurable period of time may be 24 hours. The total running average 508 is calculated individually for the soil temperature sensors 450 and 456 and individually for the soil moisture sensors 452 and 458 as the data transmission packet 470 (FIG. 12) is received by the data assimilator 500. These embodiments are presented as example configurations and are not intended to be exhaustive or limited to the embodiments in the form disclosed.

In some embodiments the data assimilator 500 on receiving the data transmission packet 470 (FIG. 12) calculates a latest running average 510. In some embodiments the latest running average 510 is calculated based on a configurable number of the temperature and moisture sensor data. In some embodiments the configurable number of the temperature and moisture sensor data may be the latest 10 temperature and moisture sensor data from the plurality of soil temperature sensor and soil moisture sensors. In some embodiments the configurable number of the temperature and moisture sensor data may be the latest 50 temperature and moisture sensor data from the plurality of soil temperature sensor and soil moisture sensors.

In some embodiments the latest running average 510 is calculated based on the configurable period of time. In some embodiments the configurable period of time may be last 10 minutes of the temperature and moisture sensor data. In some embodiments the configurable period of time may be last 2 minutes of the temperature and moisture sensor data. The latest running average 510 is calculated individually for the soil temperature sensors 450 and 456 and individually for the soil moisture sensors 452 and 458 as the data transmission packet 470 (FIG. 12) is received by the data assimilator 500. These embodiments are presented as example configurations and is not intended to be exhaustive or limited to the embodiments in the form disclosed.

In the embodiment where the total running average 508 is calculated based on the configurable period of time of 4 hours, under normal conditions, the total running average 508 over 4 hours should see gradual change due to heating by the sun or natural cooling. Normal conditions are those conditions when there is no surface fire and any soil temperature change would be due to sun or weather-related changes. Under fire conditions, the latest running average 510 would deviate significantly from this last 4-hour total running average 508.

The configured threshold change is defined in the data assimilator 500 for the plurality of soil temperature and soil moisture sensors and the configured threshold change is defined based on the type of the sensor, the plurality of different depths in the soil of the plurality of soil temperature and soil moisture sensors, the duration of time since a start of the fire and the time delay duration. For each of the soil temperature sensors 450 and 456 and each of the soil moisture sensors 452 and 458 the data assimilator 500 on receiving the data transmission packet 470 (FIG. 12) calculates a deviation as a percentage change of the latest running average 510 from the total running average 508 and compares the deviation to the configured threshold change as part of the threshold check 512. If the deviation exceeds the configured threshold change for all the plurality of soil temperature and soil moisture sensors then the data assimilator 500 will detect fire and generate the fire alert 514 for the subterranean data gatherer 400. The data assimilator 500 with send the fire alert 514 to the data processing device 1000 for the community members. The data assimilator 500 in parallel creates and sends the data transmission packet 470 (FIG. 12) with a fire alert ON to trigger the smart water pump 1100 closest to the subterranean data gatherer 400 that is deviating from the configured threshold change as part of trigger smart water pump 516.

In some embodiments multiple subterranean data gatherers 400, 400*a*, 400*b*, 400*c* communicate with a single data assimilator 500. The density of the subterranean data gatherer 400 deployment is a function of how much area can be allowed to burn before a fire is detected by the subterranean data gatherer 400. In some embodiments a cluster of subterranean data gatherers 400 can communicate with their own data assimilator 500 and multiple data assimilators 500 can communicate with the data processing device 1000. In some embodiments a cluster of subterranean data gatherers 400 can communicate with their own data assimilator 500 and multiple data assimilators 500 can communicate with the central data assimilator 500 that communicates with the data processing device 1000.

In some embodiments the data assimilator 500 maintains a mapping of the smart water pump 1100 closest to the subterranean data gatherer 400. When the subterranean data gatherer 400 that is deviating from the configured threshold change is identified by the data assimilator 500 then the smart water pump 1100 mapped closest will be started by sending the data transmission packet 470 (FIG. 12) with the fire alert ON. For each of the soil temperature sensor 450 and 456 and each of the soil moisture sensor 452 and 458 the data assimilator 500 on receiving the data transmission packet 470 (FIG. 12) calculates the deviation of the latest running average 510 from the total running average 508 and compares the deviation to the configured threshold change as part of the threshold check 512. If the deviation does not exceed the configured threshold change then the data assimilator 500 will send the data transmission packet 470 (FIG. 12) with the fire alert OFF to the smart water pump 1100 to stop the smart water pump 1100. The smart water pump 1100 can be configured to stop when the data transmission packet 470 (FIG. 12) with the fire alert OFF is received or the water in the rainwater harvesting tank 600 is finished.

These embodiments are presented as example configurations and is not intended to be exhaustive or limited to the embodiments in the form disclosed.

Figure 8:
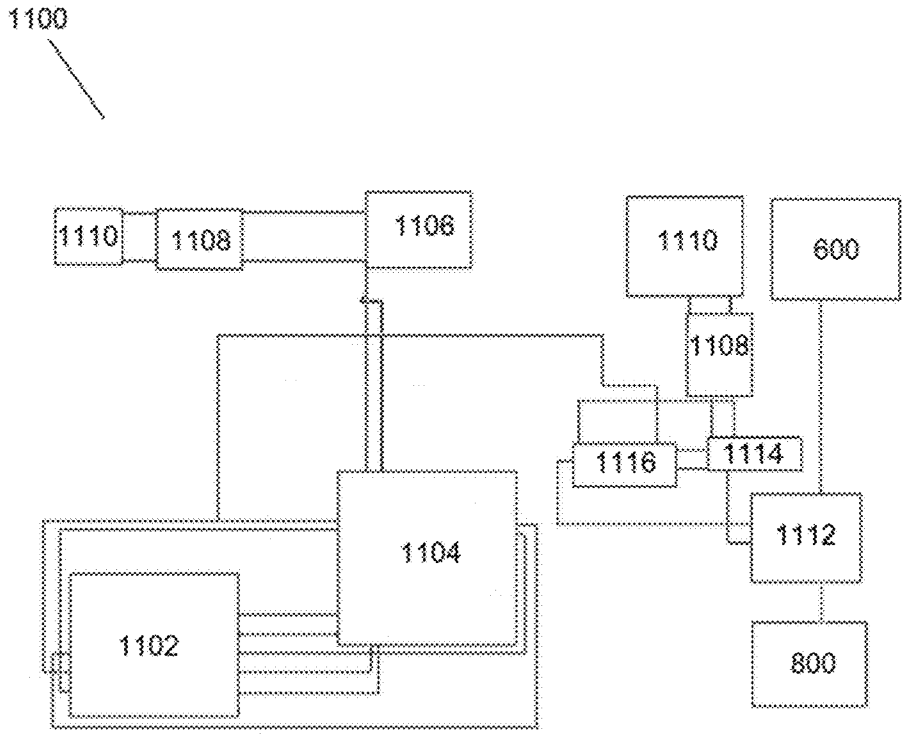
FIG. 8 is an illustration of the smart water pump in accordance with an illustrative embodiment.

FIG. 8 is an illustration of the smart water pump 1100 in accordance with an illustrative embodiment. In this depicted example of an embodiment the smart water pump 1100 is an example of one low-cost implementation for the smart water pump 1100. The smart water pump 1100 comprises of the rainwater harvesting tank 600 connected to a DC freshwater pressure diaphragm pump 1112 which is connected to the sprinkler 800. The DC fresh water pressure diaphragm pump 1112 is operated by a rechargeable battery 1114 attached to a charging board 1108, and a solar panel 1110. A microprocessor 1104 (ATmega328P/CH340, Arduino Nano board) is attached to a radio module 1102 (RFM95 W 915 Mhz, LoRa wireless receiver transmitter). The microprocessor 1104 is powered with a rechargeable battery 1106 with the charging board 1108, and the solar panel 1110.

The transmission packet 470 (FIG. 12) sent by the data assimilator 500 with the fire alert ON when received by the smart water pump 1100 through the radio module 1102 is processed by the microprocessor 1104 which in turn starts the DC freshwater pressure diaphragm pump 1112 through a 5V one-channel relay module 1116.

In some low-cost embodiments Raspberry Pi, NodeMCU, MSP430 Launch Pad, STM32 microprocessors or any other commercially available microprocessor can be used. In other embodiments different types of microprocessors for example application specific integrated circuit processors, reduced instruction set microprocessors, digital signal processors or any other commercially available microprocessor can be used. In some embodiments LTE-M and Narrowband-IoT (NB-IoT). Sigfox, Weightless SIG can be used instead of LoRa. In some embodiments any commercially available water pump can be used. In some other embodiments when the rainwater harvesting tank 600 is empty the water can be pulled from municipal water pipes into the rainwater harvesting tank 600.

In some embodiments during the install of the smart water pump 1100 the service laptop is used to set the destination ID and the geolocation of the smart water pump 1100. The sender ID is also set to ensure the smart water pump 1100 only consumes the data transmission packet 470 (FIG. 12) where the sender ID matches with what came in the data transmission packet 470 (FIG. 12).

These embodiments are presented as example configurations and is not intended to be exhaustive or limited to the embodiments in the form disclosed.

Figure 9A:
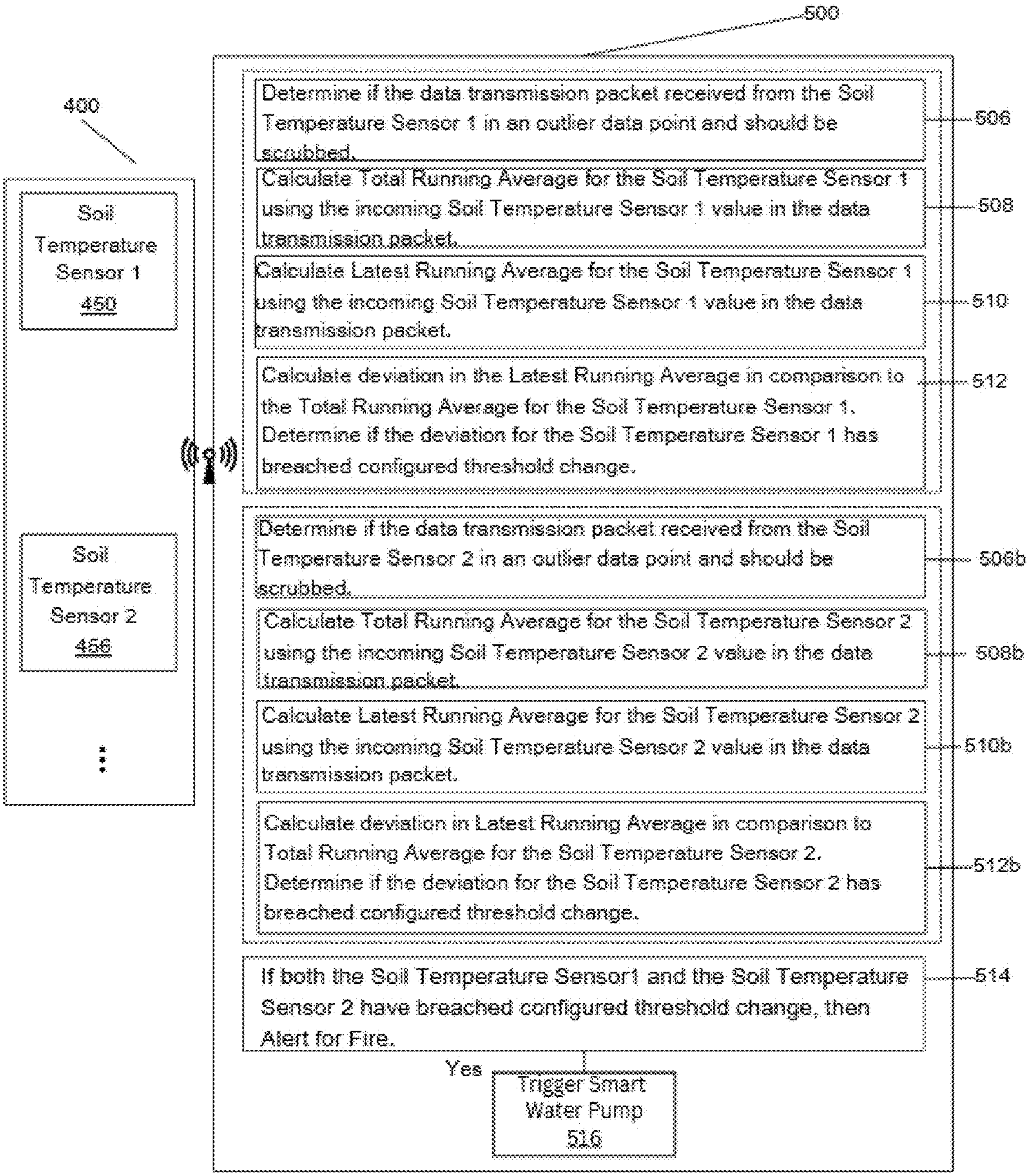
FIG. 9A is an illustration of a model of decision making for generating the fire alert and autonomously triggering the smart water pump in accordance with an illustrative embodiment.

FIG. 9A is an illustration of a model of decision making for generating the fire alert 514 and autonomously trigger smart water pump 516 in accordance with an illustrative embodiment. In this depicted example embodiment, the subterranean data gatherer 400 has two soil temperature sensors installed. The soil temperature sensor 1 450 and the soil temperature sensor 2 456 are installed at the plurality of different depths in the soil 401 (FIG. 3). In some embodiments the soil temperature sensor 1 450 is installed at the 1-inch depth in the soil 401 (FIG. 3) and the soil temperature sensor 2 456 is installed at the 3-inch depth in the soil 401 (FIG. 3). In some embodiments the soil temperature sensor 1 450 is installed at a 2-inch depth and the soil temperature sensor 2 456 is installed at a 4-inch depth. The depth at which the plurality of soil temperature and soil moisture sensors are installed can vary with different embodiments and what is presented is example configurations and is not intended to be exhaustive or limited to the embodiments in the form disclosed.

The data assimilator 500 on receiving the data transmission packet 470 (FIG. 12) from the subterranean data gatherer 400 will apply the data scrubbing 506, calculate the total running average 508 for the soil temperature sensor 1 450 and calculate the latest running average 510 for the soil temperature sensor 1 450. The data assimilator 500 will then calculate the deviation and compare the deviation to the configured threshold change as part of the threshold check 512 for the soil temperature sensor 1 450.

The data assimilator 500 on receiving the data transmission packet 470 (FIG. 12) from the subterranean data gatherer 400 will apply the data scrubbing **506*b*, calculate the total running average 508*b* for the soil temperature sensor 2 456 and calculate the latest running average 510*b* for the soil temperature sensor 2 456. The data assimilator 500 will then calculate the deviation and compare the deviation to the configured threshold change as part of the threshold check 512*b* for the soil temperature sensor 2 456**.

If both the soil temperature sensor 1 450 and the soil temperature sensor 2 456 have all individually breached the configured threshold change, the data assimilator 500 will detect fire and send the fire alert 514 for the subterranean data gatherer 400 and trigger smart water pump 516.

In some embodiments the configured threshold change for the soil temperature sensor 1 450 when installed at the 1-inch depth can be defined as 30%. The configured threshold change for the soil temperature sensor 1 450 when installed at the 2-inch depth can be defined as 20%. In some embodiments the configured threshold change for the soil temperature sensor 2 456 when installed at the 3-inch depth can be defined as 10%. The configured threshold change for the soil temperature sensor 2 456 when installed at the 4-inch depth can be defined as 5%. This is because there is a temperature gradient in the soil 401 and the upper layers of the soil 401 will get heated before the heat penetrates the lower layers of the soil 401. The configured threshold change is defined based on the depth of the plurality of soil temperature and soil moisture sensors and how quickly the fire should be detected while reducing false alarms.

In some embodiments the configured threshold change for the soil temperature sensor 1 450 when installed at the 1-inch depth can be defined as 30%. The configured threshold change for the soil temperature sensor 2 456 when installed at the 3-inch depth can be defined as 10%. In this embodiment the configured threshold change for the plurality of soil temperature and soil moisture sensors, for the data assimilator 500, is defined based on the time delay duration. In this embodiment the time delay duration is implemented by the data assimilator 500 by starting a timer for the time delay duration after both the soil temperature sensor 1 450 and the soil temperature sensor 2 456 have all individually breached the configured threshold change. If both the soil temperature sensor 1 450 and the soil temperature sensor 2 456 continue to all individually breach the configured threshold change once the time delay duration is over, the data assimilator 500 will detect fire and send the fire alert 514 for the subterranean data gatherer 400 and trigger smart water pump 516. This delayed detection of the fire will increase the probability of detecting the fire without false alarms.

In some embodiments the configured threshold change is defined based on the duration of time since the start of the fire. In these embodiments the configured threshold change for the soil temperature sensor 1 450 when installed at the 1-inch depth can be defined as 10% and the configured threshold change for the soil temperature sensor 2 456 when installed at the 3-inch depth can be defined as 30%. This is because if the fire has been ongoing for a while and is starting to slow down the upper layers of the soil 401 will have less increase in temperature while the lower layers of the soil 401 will show rapid temperature increases as the heat continues to penetrate the lower layers of the soil 401. In other embodiments the configured threshold change for the soil temperature sensor 1 450 when installed at the 1-inch depth can be defined as −10% and the configured threshold change for the soil temperature sensor 2 456 when installed at the 3-inch depth can be defined as 10%. This is because as the fire dies down the upper layers of the soil 401 start to cool while the lower layers of the soil 401 will still show rising temperatures since it takes time for the heat reduction to penetrate the lower layers of the soil 401. In these embodiments the fire is detected much later but with more certainty.

These embodiments are presented as example configurations and is not intended to be exhaustive or limited to the embodiments in the form disclosed. One or more aspects of the embodiment remove false alarm repetitions by using the configured threshold change of the plurality of soil temperature and soil moisture sensors deployed at a plurality of depth.

Figure 9B:
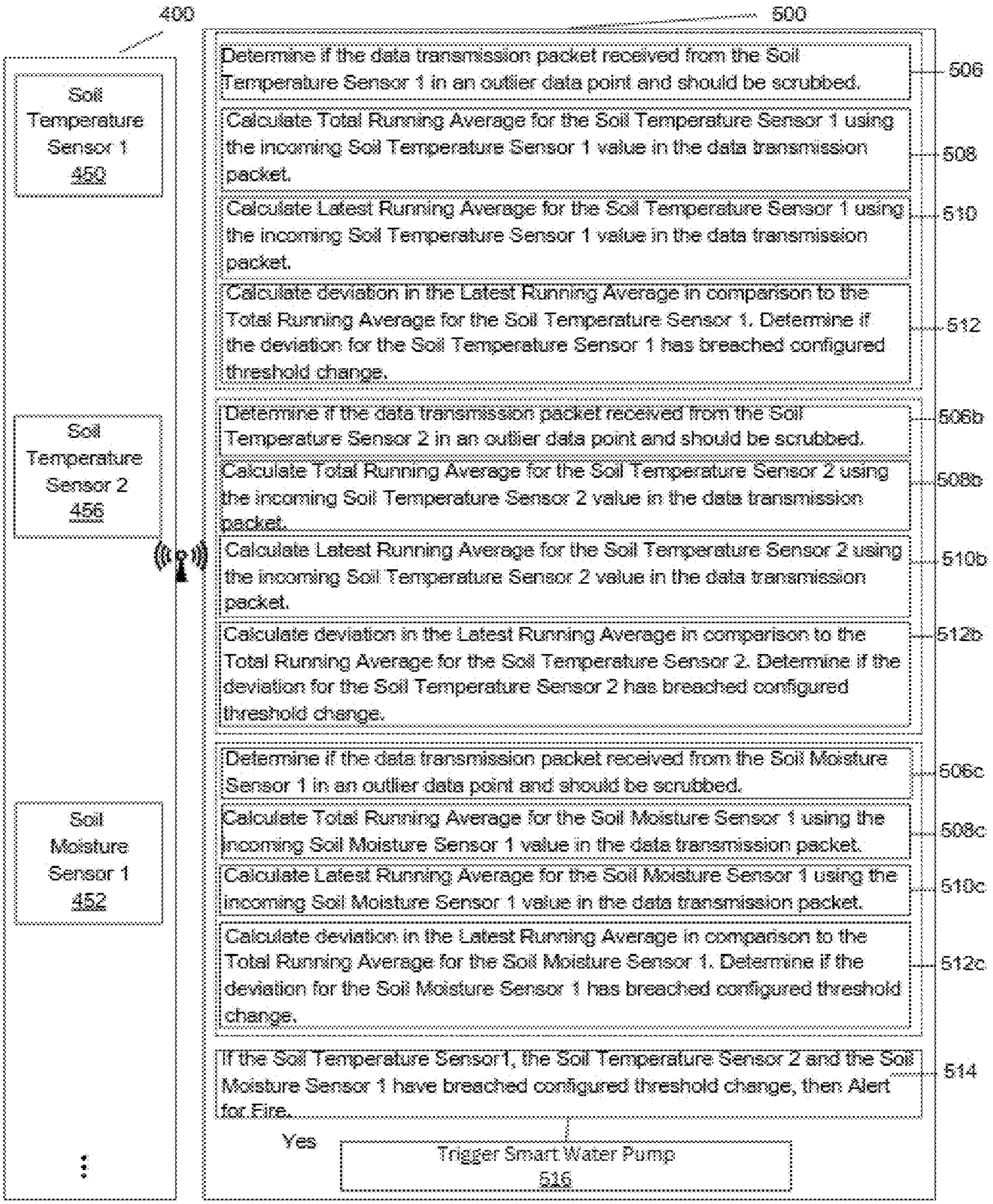
FIG. 9B is an illustration of a model of decision making for generating the fire alert and autonomously triggering the smart water pump in accordance with an illustrative embodiment.

FIG. 9B is an illustration of a model of decision making for generating the fire alert 514 and autonomously trigger smart water pump 516 in accordance with an illustrative embodiment. In this depicted example embodiment, the subterranean data gatherer 400 has two soil temperature sensors and one soil moisture sensor installed. The soil temperature sensor 1 450, the soil temperature sensor 2 456 and the soil moisture sensor 1 452 are installed at the plurality of different depth in the soil 401. In some embodiments the soil temperature sensor 1 450 and the soil moisture sensor 1 452 are installed at the 1-inch depth in the soil 401 (FIG. 3) and the soil temperature sensor 2 456 is installed at the 3-inch depth in the soil 401 (FIG. 3). In some embodiments the soil temperature sensor 1 450 and the soil moisture sensor 1 452 are installed at the 2-inch depth in the soil 401 (FIG. 3) and the soil temperature sensor 2 456 is installed at the 4-inch depth in the soil 401 (FIG. 3). The depth at which the plurality of soil temperature and soil moisture sensors are installed can vary with different embodiments and what is presented is example configurations and is not intended to be exhaustive or limited to the embodiments in the form disclosed.

The data assimilator 500 on receiving the data transmission packet 470 (FIG. 12) from the subterranean data gatherer 400 will apply the data scrubbing 506, calculate the total running average 508 for the soil temperature sensor 1 450 and calculate the latest running average 510 for the soil temperature sensor 1 450. The data assimilator 500 will then calculate the deviation and compare the deviation to the configured threshold change as part of the threshold check 512 for the soil temperature sensor 1 450.

The data assimilator 500 on receiving the data transmission packet 470 (FIG. 12) from the subterranean data gatherer 400 will apply the data scrubbing 506*b*, calculate the total running average 508*b* for the soil temperature sensor 2 456 and calculate the latest running average 510*b* for the soil temperature sensor 2 456. The data assimilator 500 will then calculate the deviation and compare the deviation to the configured threshold change as part of the threshold check 512*b* for the soil temperature sensor 2 456.

The data assimilator 500 on receiving the data transmission packet 470 (FIG. 12) from the subterranean data gatherer 400 will apply the data scrubbing 506*c*, calculate the total running average 508*c* for the soil moisture sensor 1 452 and calculate the latest running average 510*c* for the soil moisture sensor 1 452. The data assimilator 500 will then calculate the deviation and compare the deviation to the configured threshold change as part of the threshold check 512*c* for the soil moisture sensor 1 452.

If all three sensors the soil temperature sensor 1 450, the soil temperature sensor 2 456 and the soil moisture sensor 1 452 have all individually breached the configured threshold change, the data assimilator 500 will detect fire and send the fire alert 514 for the subterranean data gatherer 400 and trigger smart water pump 516.

In some embodiments the configured threshold change for the soil moisture sensor 1 452 when installed at the 1-inch depth can be defined as 15%. In some embodiments the configured threshold change for the soil moisture sensor 1 452 when installed at the 2-inch depth can be defined as 5%. This is because there is a moisture gradient in the soil 401 and the upper layers of the soil 401 (FIG. 3) will have a concentration of moisture before the upper layers of the soil 401 (FIG. 3) start to dry and moisture moves to the lower layers of the soil 401 (FIG. 3). The configured threshold change is defined based on the depth of the plurality of soil temperature and soil moisture sensors and how quickly the fire should be detected while reducing false alarms.

These embodiments are presented as example configurations and is not intended to be exhaustive or limited to the embodiments in the form disclosed.

Figure 9C:
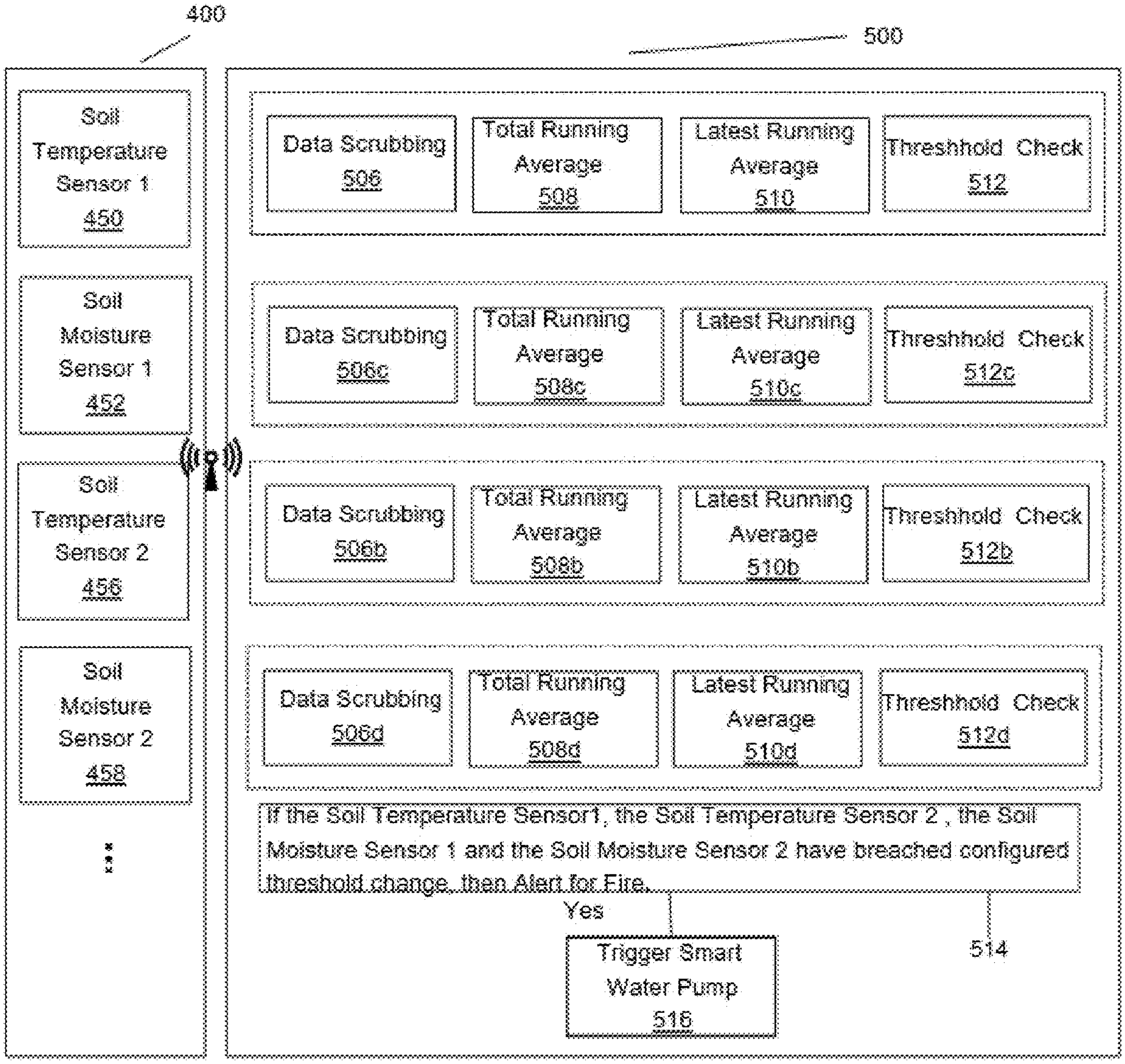
FIG. 9C is an illustration of a model of decision making for generating the fire alert and autonomously triggering the smart water pump in accordance with an illustrative embodiment.
Figure 10:
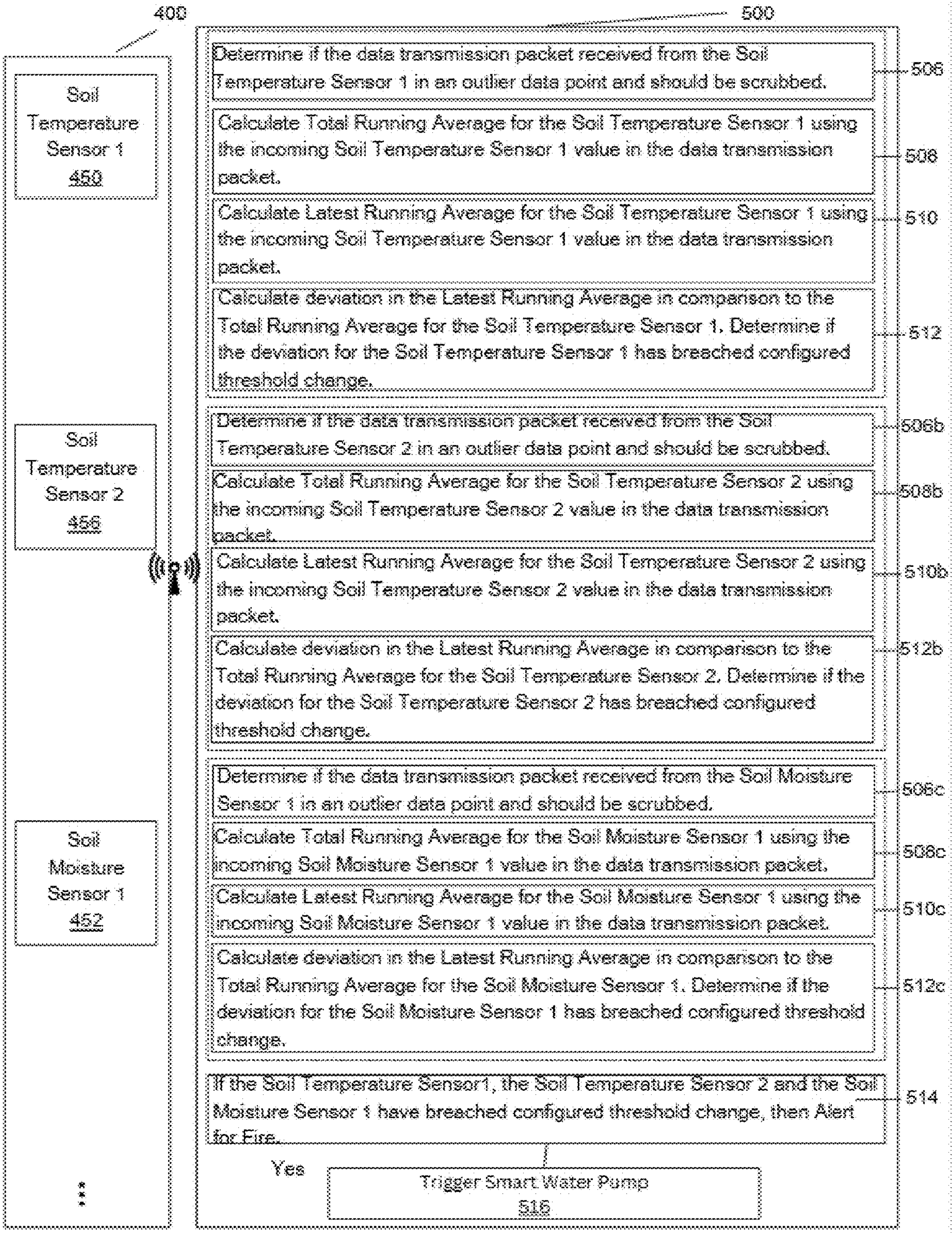
Figure 11:
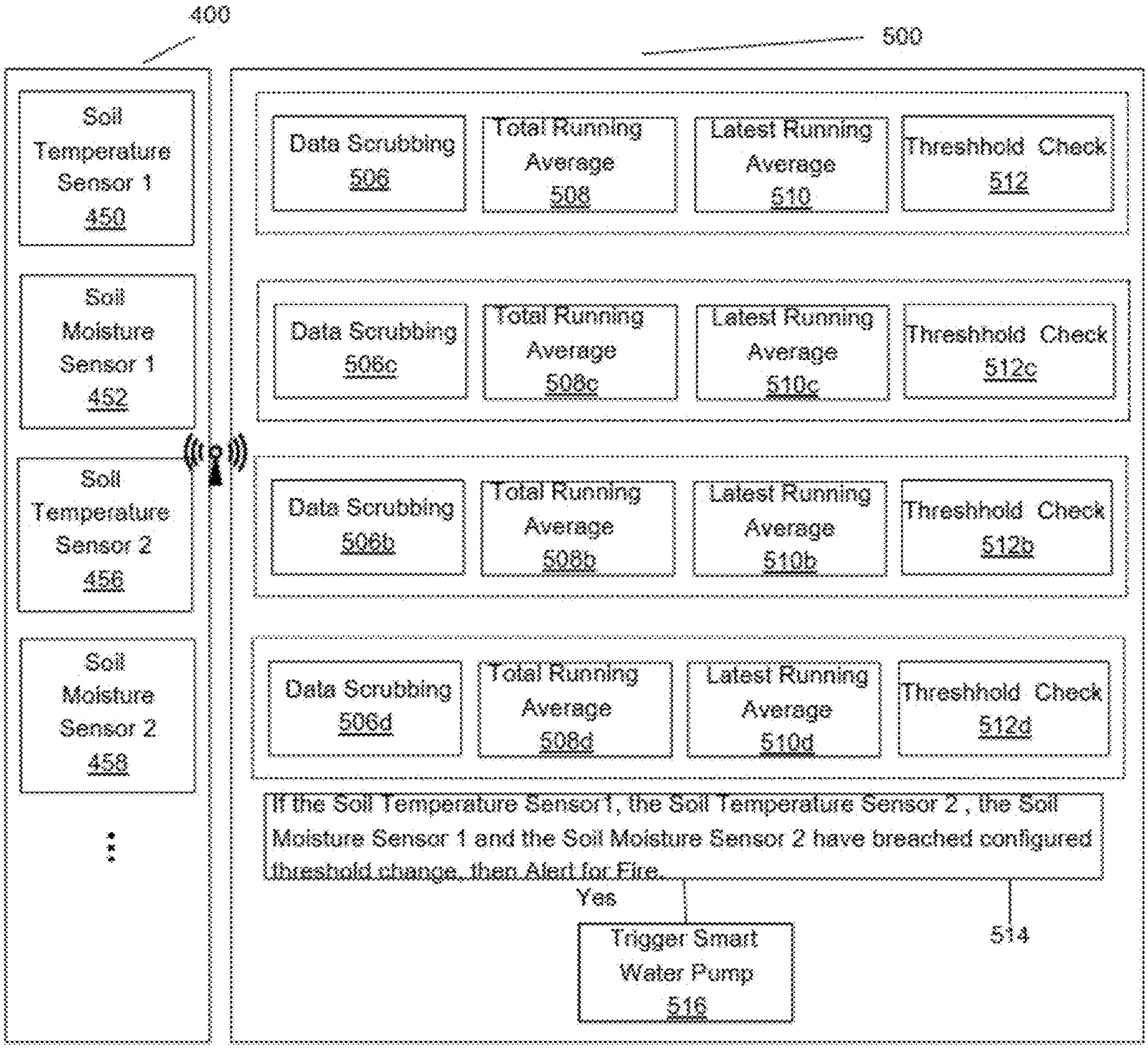

FIG. 9C is an illustration of a model of decision making for generating the fire alert 514 and autonomously trigger smart water pump 516 in accordance with an illustrative embodiment. In this depicted example embodiment, the subterranean data gatherer 400 has two soil temperature sensors and two soil moisture sensors installed. The soil temperature sensor 1 450, the soil temperature sensor 2 456, the soil moisture sensor 1 452 and the soil moisture sensor 2 458 are installed at the plurality of different depths in the soil 401 (FIG. 3). In some embodiments the soil temperature sensor 1 450 and the soil moisture sensor 1 452 are installed at the 1-inch depth in the soil 401 and the soil temperature sensor 2 456 and the soil moisture sensor 2 458 are installed at the 3-inch depth in the soil 401 (FIG. 3). In some embodiments the soil temperature sensor 1 450 and the soil moisture sensor 1 452 are installed at the 2-inch depth in the soil 401 (FIG. 3) and the soil temperature sensor 2 456 and the soil moisture sensor 2 458 are installed at 4-inch depth in the soil 401 (FIG. 3). The depth at which the plurality of soil temperature and soil moisture sensors are installed can vary with different embodiments and what is presented is example configurations and is not intended to be exhaustive or limited to the embodiments in the form disclosed.

The data assimilator 500 on receiving the data transmission packet 470 (FIG. 12) from the subterranean data gatherer 400 will apply the data scrubbing 506, calculate the total running average 508 for the soil temperature sensor 1 450 and calculate the latest running average 510 for the soil temperature sensor 1 450. The data assimilator 500 will then calculate the deviation and compare the deviation to the configured threshold change as part of the threshold check 512 for the soil temperature sensor 1 450.

The data assimilator 500 on receiving the data transmission packet 470 (FIG. 12) from the subterranean data gatherer 400 will apply the data scrubbing 506*b*, calculate the total running average 508*b* for the soil temperature sensor 2 456 and calculate the latest running average 510*b* for the soil temperature sensor 2 456. The data assimilator 500 will then calculate the deviation and compare the deviation to the configured threshold change as part of the threshold check 512*b* for the soil temperature sensor 2 456.

The data assimilator 500 on receiving the data transmission packet 470 (FIG. 12) from the subterranean data gatherer 400 will apply the data scrubbing 506*c*, calculate the total running average 508*c* for the soil moisture sensor 1 452 and calculate the latest running average 510*c* for the soil moisture sensor 1 452. The data assimilator 500 will then calculate the deviation and compare the deviation to the configured threshold change as part of the threshold check 512*c* for the soil moisture sensor 1 452.

The data assimilator 500 on receiving the data transmission packet 470 (FIG. 12) from the subterranean data gatherer 400 will apply the data scrubbing 506*d*, calculate the total running average 508*d* for the soil moisture sensor 2 458 and calculate the latest running average 510*d* for the soil moisture sensor 2 458. The data assimilator 500 will then calculate the deviation and compare the deviation to the configured threshold change as part of the threshold check 512*d* for the soil moisture sensor 2 458.

If all four sensors the soil temperature sensor 1 450, the soil temperature sensor 2 456, the soil moisture sensor 1 452 and the soil moisture sensor 2 458 have all individually breached the configured threshold change, the data assimilator 500 will detect fire and send the fire alert 514 for the subterranean data gatherer 400 and trigger smart water pump 516.

In some embodiments the configured threshold change is defined based on the duration of time since the start of the fire. In these embodiments the configured threshold change for the soil moisture sensor 1 452 at the 1-inch depth can be defined as 5% and the configured threshold change for the soil moisture sensor 2 458 at the 3-inch depth can be defined as 10%. This is because if the fire has been ongoing for a while and is starting to slow down then the upper layers of the soil 401 (FIG. 3) will start to dry while the lower layers of the soil 401 (FIG. 3) will show rapid moisture increases as the heat continues to penetrate the lower layers of the soil 401 (FIG. 3). In other embodiments the configured threshold change for the soil moisture sensor 1 452 at the 1-inch depth can be defined as −10% and the configured threshold change for the soil moisture sensor 1 452 at the 3-inch depth can be defined as 5%. This is because as the fire dies down the upper layers of the soil 401 (FIG. 3) are drying rapidly while the lower layers of the soil 401 (FIG. 3) will still show rising temperatures and rising moisture. In these embodiments the fire is detected much later but with more certainty.

In some embodiments the configured threshold change for the soil moisture sensor 1 452 when installed at the 1-inch depth can be defined as 30%. The configured threshold change for the soil moisture sensor 2 458 when installed at the 3-inch depth can be defined as 10%. In this embodiment the configured threshold change for the plurality of soil temperature and soil moisture sensors, for the data assimilator 500, is defined based on the time delay duration. In this embodiment the time delay duration is implemented by the data assimilator 500 by starting a timer for the time delay duration after both the soil moisture sensor 1 452 and the soil moisture sensor 2 458 have all individually breached the configured threshold change. If both the soil moisture sensor 1 452 and the soil moisture sensor 2 458 continue to all individually breach the configured threshold change once the time delay duration is over, the data assimilator 500 will detect fire and send the fire alert 514 for the subterranean data gatherer 400 and trigger smart water pump 516. This delayed detection of the fire will increase the probability of detecting the fire without false alarms.

In some embodiments the subterranean data gatherer 400 has the plurality of soil temperature sensors and soil moisture sensor installed at a plurality of the different depths in the soil 401. In this embodiment the data assimilator 500 will determine that all the plurality of soil temperature sensors and the soil moisture sensors have breached the configured threshold change before triggering the fire alert 514.

Some or more aspects of the example embodiments presented here detect fire irrespective of weather, season, topography, historical weather patterns.

FIG. 12 is an illustration of a block diagram illustrating an architecture of the data transmission packet suitable for use with various embodiments. The data transmission packet 470 sent by the subterranean data gatherer 400 and the data assimilator 500 includes among other things the destination ID, the sender ID, the message identifier, a data type, data lengths for individual sensor data, soil temperature sensor 1 value, soil temperature sensor 2 value, soil moisture sensor 1 value, soil moisture sensor 2 value, location coordinates, the fire alert. These data attributes are presented as example configurations and is not intended to be exhaustive or limited to the embodiments in the form disclosed. In some embodiments when the data type is 0 the data transmission packet 470 is coming with data from the subterranean data gatherer 400, when the data type is 1 the transmission packet 470 is coming from the data assimilator 500 for the smart water pump 1100, when the data type is 2 it means the subterranean data gatherer 400 is malfunctioning and requires maintenance. The data assimilator 500 on receiving the transmission packet 470 with the data type as 2 acommunicates with the data processing device 1000 to provide the real time alerts and data to the community members over the mobile app and desktop allowing the community members to do maintenance of the subterranean data gatherer 400 and replace defective parts.

Figure 13A:
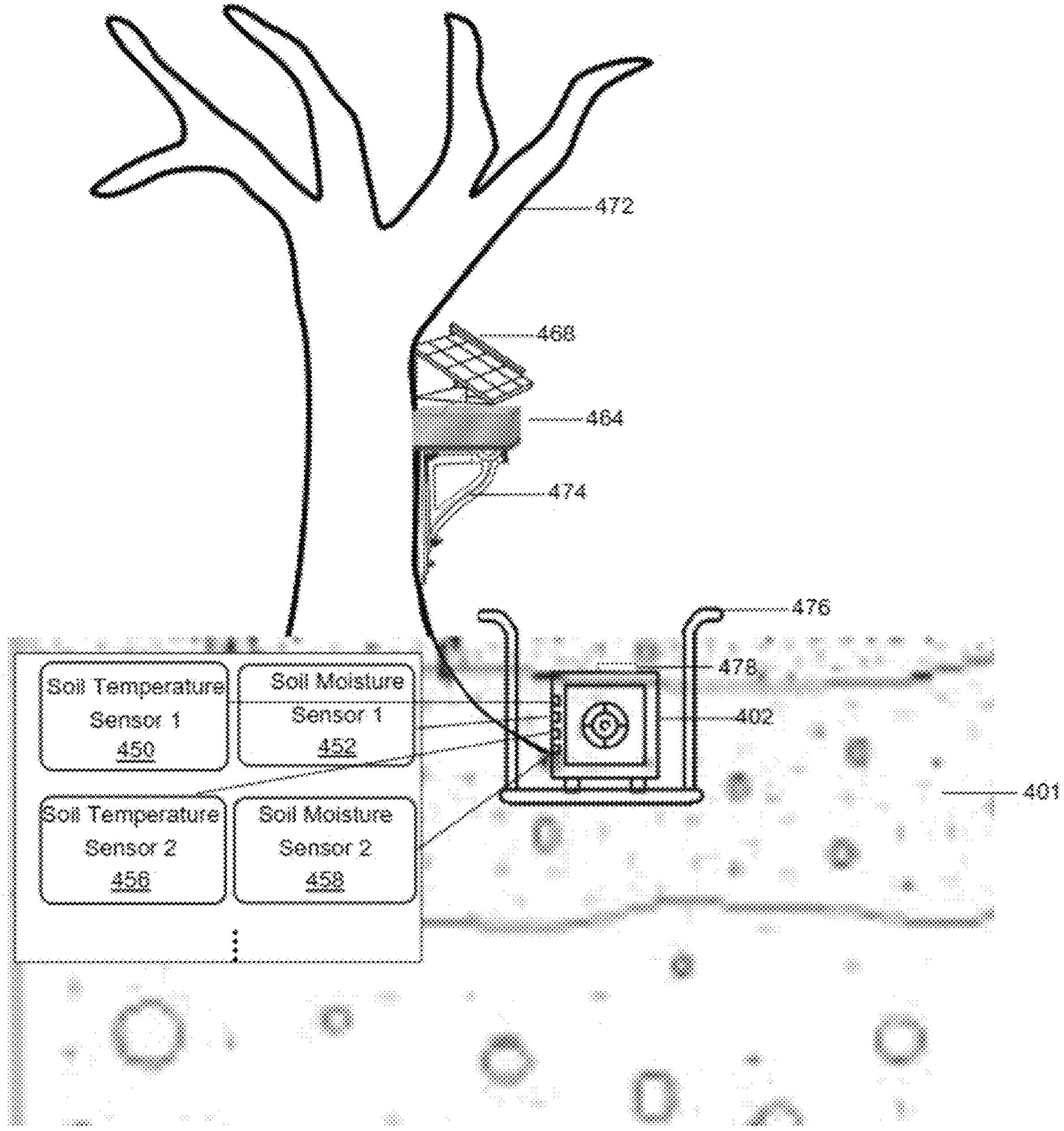
FIG. 13A is an illustration of maintenance of the subterranean data gatherer in accordance with an illustrative embodiment.

FIG. 13A is an illustration of maintenance of the subterranean data gatherer 400 in accordance with an illustrative embodiment. In some embodiments for the ease of maintenance the rechargeable battery 464 can be placed on a support 474 that is attached to a tree 472 nearby and attached to the solar panel 468. The solar panel 468 is also attached to the tree 472. In some embodiments if trees are not available then ground poles can be installed to mount the rechargeable battery 464 using a support 474 and attaching the rechargeable battery 464 to the solar panel 468 by mounting the solar panel 468 to the ground pole. This facilitates changing the rechargeable battery 464 easily if needed. In some embodiments the subterranean data gatherer housing 402 can be installed on top of a trolley platform 476 installed at the plurality of different depths in the soil 401 such that a handle of the trolley platform is above the surface of the soil 401. This helps locate the subterranean data gatherer and allows pulling the subterranean data gatherer housing 402 out for any maintenance. In some embodiments the subterranean data gatherer 400 sends an alert when the rechargeable battery 464 capacity is low and needs to be replaced. In the embodiments where the rechargeable battery 464 is installed inside the subterranean data gatherer housing 402 that is buried in the soil 401, the subterranean data gatherer housing 402 can be retrieved by pulling the trolley platform 476. The rechargeable battery 464 can easily be replaced by opening a latch 478 on the top of the subterranean data gatherer housing 402. When the data assimilator 500 receives the data transmission packet 470 (FIG. 12) with data type as 2 indicating the subterranean data gatherer 400 is malfunctioning and requires maintenance the data assimilator 500 communicates with the data processing device 1000 to provide the real time alerts and data to the community members over the mobile app and desktop allowing the community members to do maintenance of the subterranean data gatherer 400 and the defective component can be replaced by opening the latch 478. In some embodiments the latch 478 is a compression latch that features a gasket that is pushed against the opening to create a secure seal to keep dust and moisture out. In some embodiments the latch 478 features a T-handle for the community members to fold up the T-handle rotate it quarter turn and pull the door open. This will seal out dust and water from the subterranean data gatherer housing 402.

Figure 13B:
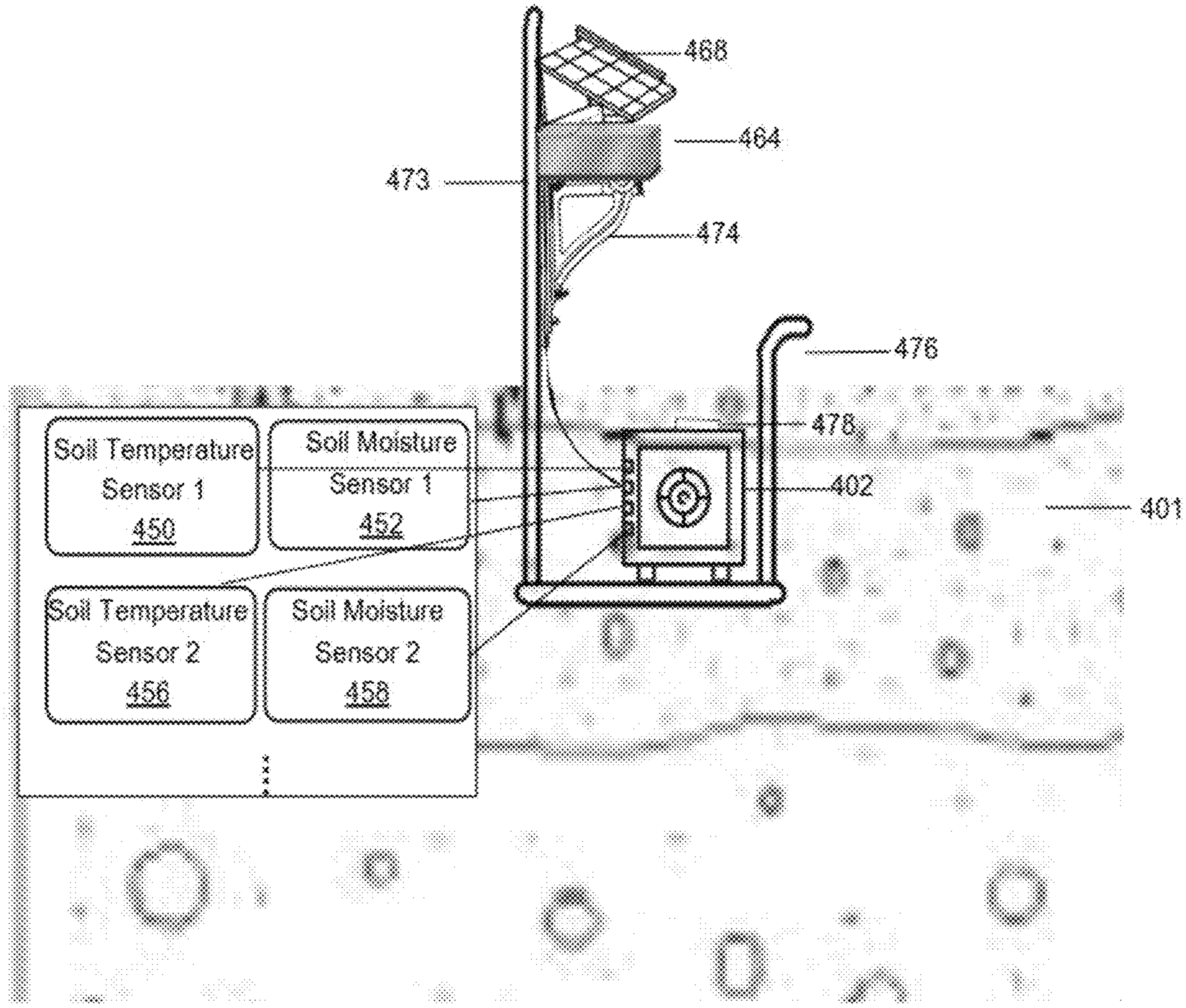
FIG. 13B is an illustration of maintenance of the subterranean data gatherer in accordance with an illustrative embodiment.

FIG. 13B is an illustration of maintenance of the subterranean data gatherer 400 in accordance with an illustrative embodiment. In some embodiments one side of the handle of the trolley platform 476 can extend into a pole structure 473. For the ease of maintenance, the rechargeable battery 464 can be placed on the support 474 attached to the pole structure 473 and attached to the solar panel 468 that is also attached to the pole structure 473.

In conclusion, the disclosure describes the autonomous forest fire detection, alerting and mitigation for communities 100 that has the plurality of the subterranean data gatherer 400 that are installed around the community 200. The subterranean data gatherer 400 utilize the plurality of soil temperature and soil moisture sensors deployed at the plurality of different depths in the soil 401. The subterranean data gatherer 400 sends the data transmission packet 470 (FIG. 12) to the data assimilator 500. The data assimilator 500 determines if there is fire based on all the plurality of soil temperature and soil moisture sensors of the subterranean data gatherer 400 breaching the configured threshold change and issues the fire alert 514 and triggers the smart water pump 1100 to start the sprinkler 800 to slow or completely put out the fire. One or more aspects of the present disclosure that utilizes subterranean soil-based sensors for detecting fire removes the issue of false alarm repetitions that plague ambient sensor-based solutions. One or more aspects of the present disclosure is in contrast with existing solutions where most components are destroyed in the fire and hence do not function at the time of fire. One or more aspects of the present disclosure remove false alarm repetitions by using the configured threshold change of the plurality of soil temperature and soil moisture sensors deployed at the plurality of different depths in the soil 401. One or more aspects of the example embodiments presented here detect fire irrespective of the environmental conditions, the weather, the season, topography, historical weather data while the effectiveness of the existing solutions is dependent on season and topography and environmental conditions.

The description of the different illustrative embodiments has been presented for purposes of illustration and description, and is not intended to be exhaustive or limited to the embodiments in the form disclosed. Many modifications and variations will be apparent to those of ordinary skills in the art.

Further, different illustrative embodiments may provide different features as compared to other illustrative embodiments. The embodiment or embodiments selected are chosen and described in order to best explain the principals of the embodiments, the practical application, and to enable others of ordinary skill in the art to understand the disclosure for various embodiments with various modifications as are suited to the particular use contemplated.

What is claimed is:

1. A device for forest fire detection comprising:

a subterranean data gatherer having a plurality of soil temperature and soil moisture sensors installed at a plurality of different depths in a soil; and a data assimilator having a configured threshold change for said plurality of soil temperature and soil moisture sensors, said configured threshold change is defined based on said plurality of different depths in said soil of said plurality of soil temperature and soil moisture sensors, and said data assimilator receives a data transmission packet from said subterranean data gatherer and said data assimilator detects fire and generates a fire alert when said plurality of soil temperature and soil moisture sensors have all individually breached said configured threshold change; and said plurality of different depths in said soil of said plurality of soil temperature and soil moisture sensors is decided by said soil properties including thermal conductivity, thermal diffusivity, volumetric heat capacity, said soil type, said soil density and said soil porosity.

2. The device of claim 1, wherein said configured threshold change for said plurality of soil temperature and soil moisture sensors, for said data assimilator, is defined based on a duration of time since a start of a fire.

3. The device of claim 1, wherein said configured threshold change for said plurality of soil temperature and soil moisture sensors, for said data assimilator, is defined based on a time delay duration, wherein said fire alert will be raised when said plurality of soil temperature and soil moisture sensors all individually continue to breach said configured threshold change once said time delay duration is over.

4. The device of claim 1, wherein said subterranean data gatherer is placed inside a subterranean data gatherer housing and said subterranean data gatherer housing is installed at said plurality of different depths in said soil and said subterranean data gatherer housing is made of fire-resistant materials and is waterproof.

5. The device of claim 1, wherein said subterranean data gatherer is placed inside a subterranean data gatherer housing and said subterranean data gatherer housing is installed on top of a trolley platform installed at said plurality of different depths in said soil such that a handle of said trolley platform is above the surface of said soil to easily locate said subterranean data gatherer for any maintenance.

6. The device of claim 1, wherein said subterranean data gatherer is placed inside a subterranean data gatherer housing wherein said subterranean data gatherer housing consists of a latch to perform maintenance.

7. The device of claim 1, wherein said plurality of different depths in said soil of said plurality of soil temperature and soil moisture sensors is decided by said soil properties including thermal conductivity, thermal diffusivity, volumetric heat capacity, said soil type, said soil density and said soil porosity, and said configured threshold change for said plurality of soil temperature and soil moisture sensors, for said data assimilator, is defined based on said plurality of different depths in said soil of said plurality of soil temperature and soil moisture sensors.

* * * * *